US012559129B2

(12) United States Patent
Lasram et al.

(10) Patent No.: US 12,559,129 B2
(45) Date of Patent: Feb. 24, 2026

(54) CAPTURING AND SIMULATING RADAR DATA FOR AUTONOMOUS DRIVING SYSTEMS

(71) Applicant: Zoox, Inc., Foster City, CA (US)

(72) Inventors: Anas Lasram, South San Francisco, CA (US); James Graham Dolan, Sarasota, FL (US); Ximing Li, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 661 days.

(21) Appl. No.: 17/710,596

(22) Filed: Mar. 31, 2022

(65) Prior Publication Data

US 2023/0311930 A1    Oct. 5, 2023

(51) Int. Cl.
*B60W 60/00*          (2020.01)
*G01S 7/41*           (2006.01)

(52) U.S. Cl.
CPC ..... *B60W 60/001* (2020.02); *B60W 2420/408* (2024.01); *G01S 7/412* (2013.01); *G01S 7/415* (2013.01)

(58) Field of Classification Search
None
See application file for complete search history.

(56) References Cited

U.S. PATENT DOCUMENTS 10,929,711 B1    2/2021  Pfeiffer
11,276,177 B1    3/2022  Tsai et al.

2019/0171912 A1    6/2019   Vallespi-Gonzalez
2019/0302259 A1    10/2019  Van Fleet et al.
2020/0074266 A1    3/2020   Peake et al.
2020/0103523 A1    4/2020   Liu et al.
2020/0301799 A1    9/2020   Manivasagam et al.
2021/0150807 A1*   5/2021   Zhou ..................... G06N 3/047
2021/0294346 A1    9/2021   Mac
2021/0383616 A1*   12/2021  Rong ....................... G06N 3/08
2022/0284624 A1    9/2022   Nimmagadda et al.
2022/0366636 A1*   11/2022  Lasram ............... G06V 10/803

(Continued)

OTHER PUBLICATIONS

The PCT Search Report and Written Opinion mailed Jul. 14, 2023 for PCT application No. PCT/US23/16755, 10 pages.

(Continued)

*Primary Examiner* — Donald J Wallace
*Assistant Examiner* — Paysun Wu
(74) *Attorney, Agent, or Firm* — Lee & Hayes, P.C.

(57)                ABSTRACT

A simulation system may generate radar data for synthetic simulations of autonomous vehicles, by using a data store of object radar data and attributes determined from sensor data captured in real-world physical environments. The radar data store may include radar point clouds representing real-world objects and associated object attributes, as well as radar background data captured for a number of physical environments. The simulation system may construct radar data for use in a simulation based on radar object data and/or radar background data, including using various probabilities within various overlay regions to determine subsets of object and background radar points to be rendered. During a simulation, the generated radar data may be provided to a simulated radar sensor of a simulated vehicle configured to execute trained perception models based on radar data input.

20 Claims, 11 Drawing Sheets

</div>

200 ⟶

(56) References Cited

U.S. PATENT DOCUMENTS

| | | | | |
|---|---|---|---|---|
| 2023/0154127 A1 * | 5/2023 | Martin-Bragado | ..... | G06T 15/20 |
| | | | | 345/419 |
| 2023/0298263 A1 * | 9/2023 | Yang | ......................... | G06T 7/50 |
| | | | | 382/100 |
| 2023/0311932 A1 | 10/2023 | Lasram | | |

OTHER PUBLICATIONS

Office Action for U.S. Appl. No. 17/733,430, Dated Sep. 5, 2024, 24 pages.
Manivasagam, Sivabalan, et al. "Lidarsim: Realistic lidar simulation by leveraging the real world." Proceedings of the IEEE/CVF Conference on Computer Vision and Pattern Recognition. 2020 (Year: 2020).
Office Action for U.S. Appl. No. 17/710,639, Dated Sep. 23, 2025, 41 pages.

\* cited by examiner

OBJECT RADAR DATA

600 →

| Object ID 604 | Range 606 | Yaw 608 | Azimuth 610 | Speed 612 | BB Width 614 | BB Height 616 | Radar Point Cloud 618 |
|---|---|---|---|---|---|---|---|
| ID_123 | 2.7m | 155 deg | 21 deg | 4.4 m/s | 4.1 m | 2.2 m | [Link to Cloud Data Structure] |
| ID_124 | ... | ... | ... | ... | ... | ... | [Link to Cloud Data Structure] |
| ID_125 | ... | ... | ... | ... | ... | ... | [Link to Cloud Data Structure] |
| ID_126 | ... | ... | ... | ... | ... | ... | [Link to Cloud Data Structure] |

BACKGROUND RADAR DATA

602 →

| Background ID 620 | Simulation Type 622 | Driving Conditions 624 | Radar Point Cloud 626 |
|---|---|---|---|
| ID_BG001 | Highway | Daytime/Clear | [Link to Cloud Data Structure] |
| ID_BG002 | City | Night/Fog | [Link to Cloud Data Structure] |
| ID_BG003 | ... | ... | [Link to Cloud Data Structure] |
| ID_BG004 | ... | ... | [Link to Cloud Data Structure] |

FIG. 6

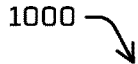

RECEIVE LOG DATA INCLUDING SENSOR DATA OF ENVIRONMENT
1002

DETERMINE OBJECT(S) WITHIN ENVIRONMENT AND ASSOCIATED ATTRIBUTES
1004

DETERMINE RADAR POINT CLOUD(S) ASSOCIATED WITH OBJECT(S)
1006

STORE OBJECT DATA
IN SIMULATION RADAR DATA STORE?
1008

No

SAMPLE TO
DETERMINE
NEXT OBJECT(S)
1010

YES

MODIFY RADAR DATA AND/OR DISCRETIZE OBJECT ATTRIBUTES
1012

STORE OBJECT RADAR DATA AND ATTRIBUTES IN
SIMULATION RADAR DATA STORE
1014

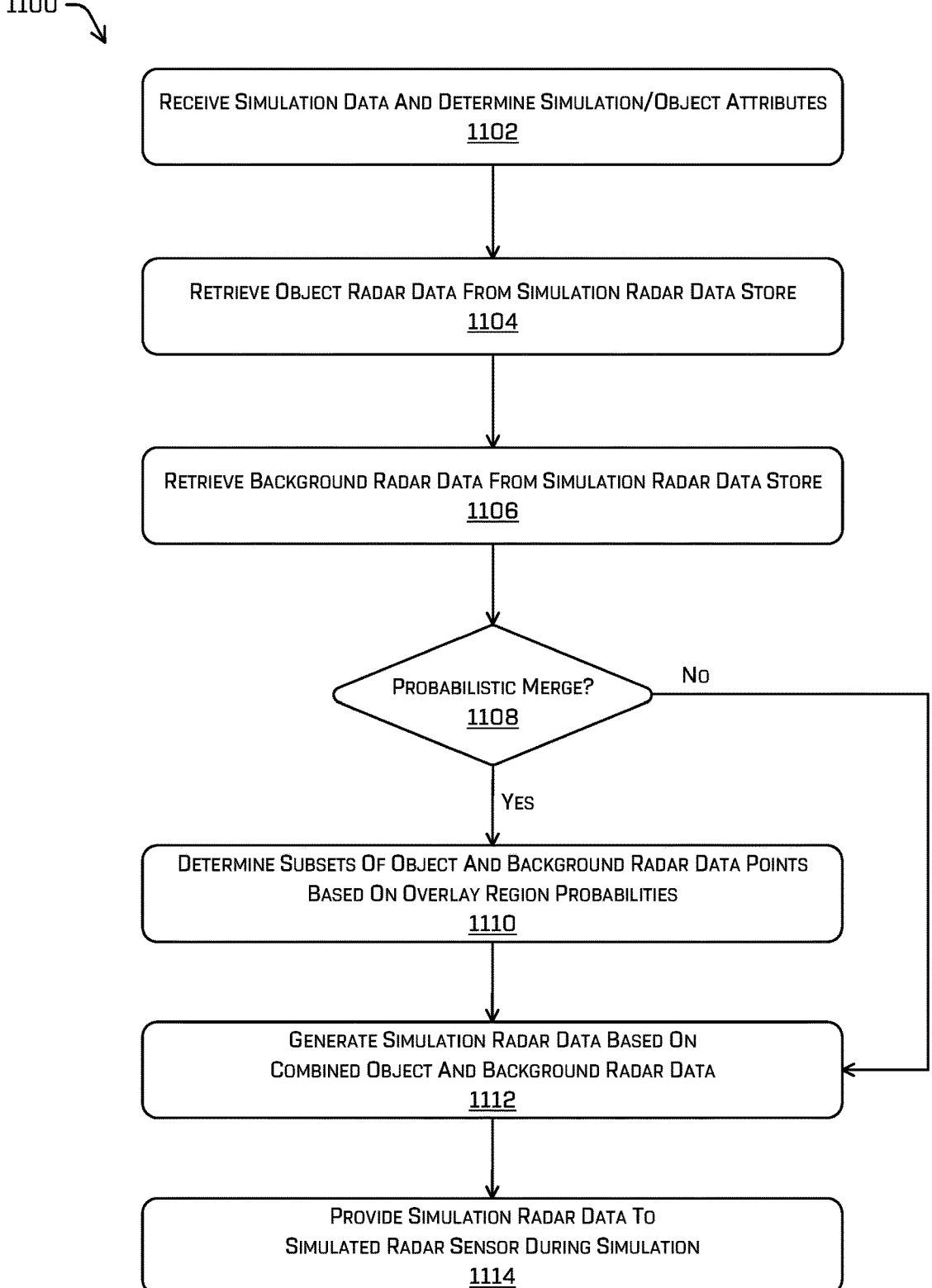

RECEIVE SIMULATION DATA AND DETERMINE SIMULATION/OBJECT ATTRIBUTES
1102

RETRIEVE OBJECT RADAR DATA FROM SIMULATION RADAR DATA STORE
1104

RETRIEVE BACKGROUND RADAR DATA FROM SIMULATION RADAR DATA STORE
1106

PROBABILISTIC MERGE?
1108

No

YES

DETERMINE SUBSETS OF OBJECT AND BACKGROUND RADAR DATA POINTS
BASED ON OVERLAY REGION PROBABILITIES
1110

GENERATE SIMULATION RADAR DATA BASED ON
COMBINED OBJECT AND BACKGROUND RADAR DATA
1112

PROVIDE SIMULATION RADAR DATA TO
SIMULATED RADAR SENSOR DURING SIMULATION
1114

FIG. 11

CAPTURING AND SIMULATING RADAR DATA FOR AUTONOMOUS DRIVING SYSTEMS

BACKGROUND

Simulated data and simulations can be used to test and validate features and functionalities of real-world systems, including features and functionalities that may be otherwise prohibitive to test in the real world (e.g., due to safety concerns, limitations on time, repeatability, cost, etc.). For example, autonomous vehicles and other moving vehicles may use driving simulations to test and improve passenger safety, vehicle decision-making, sensor data analysis, and route optimization. However, driving simulations that accurately reflect real-world scenarios may be difficult to create, as data used to create such simulations may be noisy, inconsistent, and/or incomplete. Additionally, driving simulations may involve multiple different systems and components interacting in a real-time simulated environment, which may be resource and computationally expensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 6 depicts two example tables associated with a simulation radar data store, in accordance with one or more examples of the disclosure.

FIG. 10 depicts an example process for generating simulation radar data for use in synthetic simulations, based on sensor data captured in an environment, in accordance with one or more examples of the disclosure.

FIG. 11 depicts an example process of generating simulation radar data for a synthetic simulation, in accordance with one or more examples of the disclosure.

DETAILED DESCRIPTION

Figure 1:
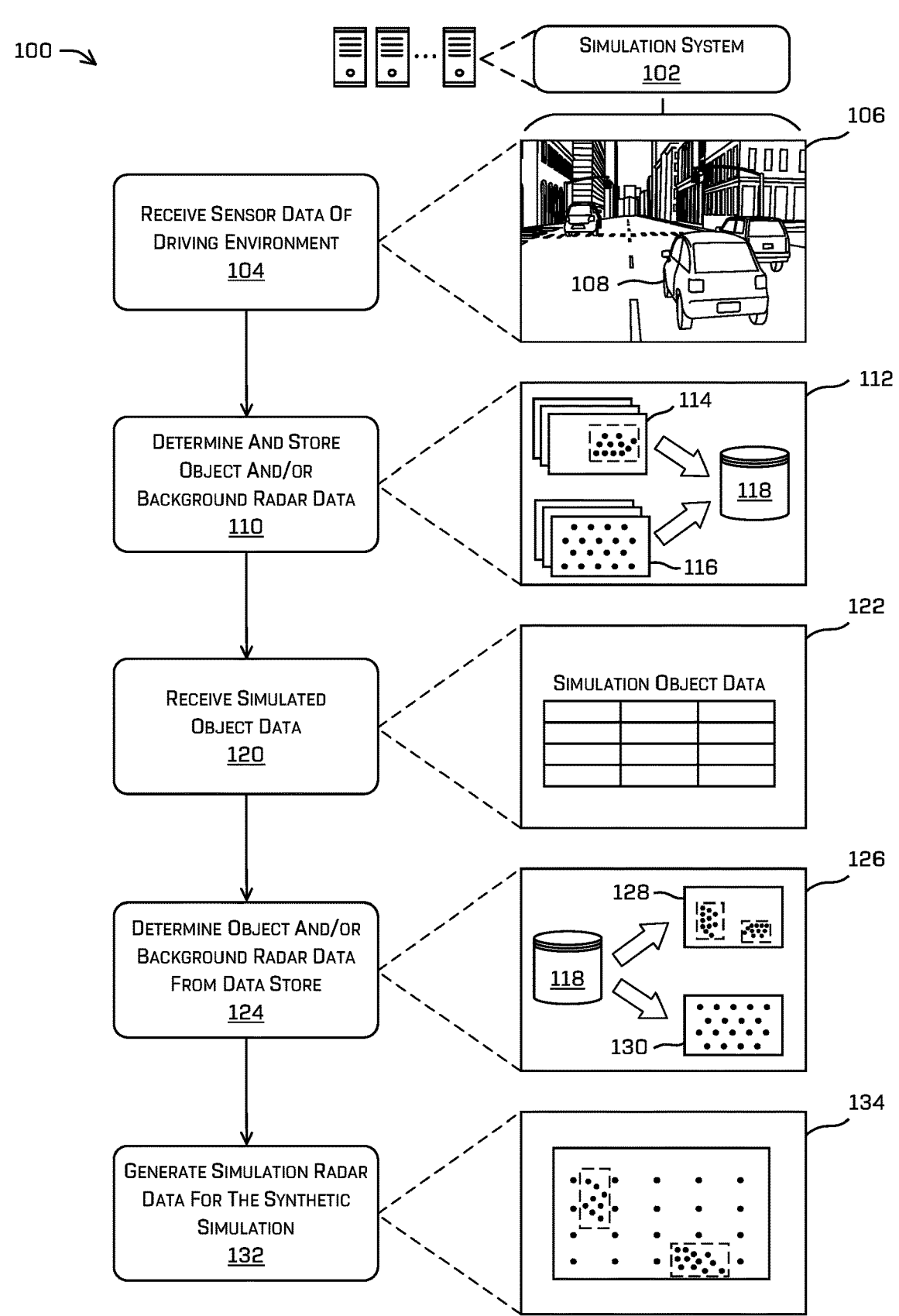
FIG. 1 depicts a technique for generating simulation radar data based on sensor data captured in an environment, and using the simulation radar data in a synthetic simulation, in accordance with one or more examples of the disclosure.

This disclosure relates to techniques for generating radar data for use in synthetic simulations of real-world systems, such as synthetic autonomous vehicle simulations. In various examples described herein, a simulation system may be configured to generate and store simulation radar data for synthetic simulations, based on real-world object radar data and object attributes captured by sensors within physical environments. Object radar point clouds associated with detected objects, associated object attributes, and background radar data may be captured and stored in a simulation radar data store. In some examples, the radar data (e.g., object radar point clouds, radar background data, etc.) and/or associated attributes may be modified to remove or discretize data fields, thereby reducing the dimensionality and storage requirements of the simulation radar data store.

Various combinations of radar data may be retrieved from the simulation radar data store and used to construct simulation radar data for synthetic simulations. For example, simulation data for an autonomous vehicle driving simulation may include object attributes for one or more simulated objects, such as the object types or classifications, positions, sizes, poses, velocities, material compositions, and the like. Based on the attributes of the simulated objects, the simulation system may retrieve one or more associated radar point clouds from the simulation radar data store. As noted above, the radar point clouds may correspond to real-world radar point clouds captured as sensor data within vehicle logs. The simulation system also may retrieve background radar data, and may generate radar data for use in the simulation by merging the background radar data with one or more object radar point clouds. In some examples, merging the background and object radar data may include applying radar point probabilities to associated overlay regions to determine subsets of the background and object radar data points to be retained in the simulation radar data.

During the execution of a simulation, the radar data generated by the simulation system may be provided to one or more simulated radar sensors of a simulated vehicle. In some examples, the simulated vehicle may be configured to execute trained perception models based at least in part on radar data input. The perception models may include trained neural networks that are trained using real-world radar data. In some instances, however, the trained perception models may provide inaccurate (or less accurate) outputs when provided with synthetically generated radar data as input data. This application describes techniques for generating simulation radar data that is not synthetically generated but is based on real-world object and background radar data captured by radar sensors within physical environments. The techniques described herein can include using real-world object radar data representing simulated objects, and/or real-world background data representing simulation backgrounds. Background data, in particular, can be simulated instead of using real-world background data. As described below, simulated object data and/or simulated background data can be used individually or can be combined together into simulated radar data that provides realistic radar data patterns and characteristics than synthetically generated radar data. As a result, the simulation radar data generated according to the techniques described herein can be provided as input to trained perception models, thereby providing improvements to autonomous vehicle simulations by supporting more accurate synthetic simulations to simulate realistic vehicle behavior more accurately and efficiently.

As noted above, driving simulations can be used, for example, to test and validate the responses of a simulated vehicle to a variety of different simulated scenarios for later use in the real world. For example, driving simulations may model normal or abnormal driving conditions and/or vehicle conditions, using a variety of simulated environments and simulated objects or agents. Driving simulations also may model various traffic conditions, environmental conditions, roadway obstructions, accidents, etc., to test and validate passenger safety, vehicle routing, decision-making, efficiency, etc. Certain driving simulations may test the responses of a simulated vehicle to defective and/or faulty sensors on the vehicle, and/or may be used to test individual components or systems of the simulated vehicle (e.g., a perception component, a decision-making or planning component, etc.). The same or different driving simulations may test the simulated vehicle as a whole including interactions between the various components or systems of the vehicle. Simulations may include scenarios which rarely occur in the real world, such as collisions with other objects, violations of traffic rules, etc., yet still require testing to validate safe operation, as well as provide a mechanism to consistently test control algorithms while varying certain factors and keeping other factors constant.

When generating driving simulations to perform testing and validation of an autonomous vehicle, a simulation system may instantiate any number of different simulated environments and/or driving scenarios to run within the simulated environments. Each instantiation of a simulated environment can be unique and defined, and enumerating all possible simulated environments and scenarios can require inordinate amounts of time and computing resources. However, unless every possible simulated environment is constructed, certain valuable driving scenarios may go untested. Thus, it can be valuable for simulation systems to generate as many simulated environments and scenarios as possible, in a timely and resource-efficient manner.

To generate driving simulations that cover a variety of simulated environments and driving scenarios, a simulation system may generate and run log-based simulations based on driving scenarios captured from vehicle log data and/or synthetic simulations based on synthetically generated driving environments and scenarios. For log-based driving simulations, the scenarios upon which driving simulations are generated may be based on driving log data captured in actual physical environments. For instance, the simulation system may generate simulations utilizing techniques such as those described in U.S. patent application Ser. No. 16/376,842, filed Apr. 5, 2019 and entitled "Simulating Autonomous Driving Using Map Data and Driving Data," U.S. patent application Ser. No. 16/555,988, filed Aug. 29, 2019 and entitled "Vehicle Controller Simulations," U.S. patent application Ser. No. 17/184,128, filed Feb. 24, 2021 and entitled "Agent Conversions in Driving Simulations," U.S. patent application Ser. No. 17/184,169, filed Feb. 24, 2021 and entitled "Simulating Agents based on Driving Log Data," the entire contents of which are incorporated herein by reference for all purposes.

In other examples, driving simulations may be synthetic simulations that are generated based on synthetic driving environments and/or scenarios. A synthetic driving scenario may be created, ab initio, programmatically, and need not be based on any driving log data associated with physical environments. In other instances, synthetic driving scenarios may be generated by adding, removing, and/or modifying various static or dynamic objects from a log-based driving scenario. To generate a synthetic environment and/or synthetic scenario on which to perform a driving simulation, the simulation system may determine and programmatically simulate the driving environment including the various static and/or dynamic objects (e.g., agents) within the simulated environment defined by the driving scenario. To programmatically generate and control the various simulated objects, the simulation system may use operational parameters to define the various attributes and/or behaviors of each simulated object. For instance, the operational parameters used to control a simulated object during a synthetic simulation may include parameters that define the starting location, pose, velocity, and/or acceleration of the simulated object at the beginning of the simulation. Additional operational parameters may include data values and/or settings used by simulated object controller(s) to determine navigation decisions and/or other behaviors for the simulated objects during the simulation. Based on the operational states, movements and/or other behaviors of the simulated objects at various time steps during a synthetic simulation, the simulation system may generate simulated sensor data to represent the simulated objects and the simulated environment as a whole. During the simulation, the simulated sensor data may be provided as input data to the simulated sensors of the simulated vehicle, allowing the simulation system to observe and validate the features and functionalities of the simulated vehicle.

Synthetic simulations, based on wholly or partially synthetic scenarios, may provide advantages over log-based simulations in some cases. For instance, log-based simulations may be based on real-world driving log data captured by the sensors of a vehicle traversing a physical environment, and as a result, the simulated environment and objects in log-based simulations may be constrained to appear and behave in the same manner as in the captured log data. Thus, log-based simulations may be limited as to the driving environments and scenarios that can be provided, and as to the features and functionalities that they can test and validate. Synthetic simulations, in contrast, can be programmed to simulate any possible driving scenario and to include any possible number and/or configuration of static and dynamic objects within a simulated environment. As a result, synthetic scenarios can provide more robust simulation testing and validation, by exposing the vehicle control systems in the simulation to many more possible combinations of simulated environments and configurations of simulated objects, object attributes, and/or object behaviors. For instance, log-based driving scenarios may be unable to represent particular configurations of simulated objects that have not been previously observed and captured as driving log data. However, synthetic simulations based on wholly or partially synthetic driving scenarios can readily include rarely (or never) observed environments and scenarios with particular object combinations or configurations, and/or object behaviors or attributes, by programmatically generating these uncommon simulation objects or other simulation features.

For these reasons, synthetic simulations may provide more complete and robust test coverage of the vehicle control systems. However, generating and executing synthetic simulations may be more technically challenging than log-based simulations in some respects. For instance, generating synthetic multi-model sensor data (e.g., image data, lidar data, radar data, sonar data, etc.) to represent simulated objects within a simulation scenario can be technically difficult and computationally expensive. The simulated sensor data may be provided to simulated vehicle sensors during the simulation, and thus if the sensor data is inconsistent or unrealistic then the simulation may fail to adequately test the vehicle controllers. Sensor data such as radar data (e.g., radar data points and/or point clouds) and lidar data (e.g., lidar point clouds) may be particularly difficult to synthetically generate in a realistic manner that accurately emulates real-world radar or lidar data. When unrealistic synthetically generated sensor data is provided as input to trained neural network models (e.g., trained object perception models) within the simulated vehicle, the trained models may provide aberrant outputs that cannot be used to validate the trained models or the functionality of vehicle controllers based on the trained models. Further, due to the opacity of the trained neural networks, it may be difficult to determine how the trained models are interacting with the synthetic sensor data to provide the aberrant outputs, or how to modify the synthetical sensor data to improve the efficacy of the simulation.

To address the challenges associated with generating and executing synthetic scenarios, various techniques described herein relate to generating radar data for use in synthetic simulations, using a simulation radar data store including object radar data and object attributes determined from sensor data captured in real-world physical environments. In various examples, the simulation radar data store may include object radar data, such as radar point clouds or radar data points within object bounding boxes, as well as background radar data captured from one or more real-world physical environments. To generate a synthetic simulation, the simulation system may construct simulated radar data associated with a simulated object, for example, by retrieving object radar data from the simulation radar data store based on the attributes of the simulated object, and combining the object radar data with background radar data using a probabilistic merging technique. During the synthetic simulation, the simulation system may provide the generated radar data to the simulated radar sensors of the simulated vehicle.

As shown in the various examples described herein, these techniques may improve the functioning, safety, and efficiency of autonomous and semi-autonomous vehicles operating in driving environments, by generating and executing synthetic simulations that can more effectively test and validate the object detection models running on autonomous vehicles. For instance, these techniques may leverage the advantages of synthetic simulations, such as more complete and robust simulation coverage, while improving the efficacy of the synthetic simulations by providing real-world radar data to the simulated radar sensors in the synthetic simulations. By providing the simulated radar sensors with more accurate and real-world radar data for simulated objects in the simulation, the trained perception models that execute on the simulated vehicle can provide more accurate and realistic outputs which allows for improved testing and validation of the trained models themselves, and the additional features and functionalities of the vehicle controllers based on the outputs of the trained models (e.g., vehicle navigation systems, trajectory planning systems, safety systems, etc.).

FIG. 1 illustrates an example process 100 of generating simulation radar data based on sensor data captured in a real-world physical environment, and using the simulation radar data in a synthetic simulation. In various examples, some or all operations of the example process 100 may be performed by computing devices configured as a simulation system 102. The simulation system 102 may include, for instance, a driving simulation system, virtual driving simulator or other type of simulation system, and/or sensor engines configured to generate and provide sensor input data to simulation systems. Process 100, and various other examples herein, are described in reference to driving simulations during which a simulated vehicle including one or more simulated sensors operates within a simulated environment. During a simulation, the simulation system 102 provides the simulated vehicle sensors with sensor input data representing the simulated environment and the simulated objects therein, and the simulated vehicle responds to the sensor input data by controlling the vehicle. However, it can be understood from the context of this disclosure that techniques described herein are not limited to driving simulation systems, and may be implemented in a similar or identical manner within other systems, including but not limited to video gaming systems, virtual reality systems, non-driving simulation systems (e.g., flight simulators, nautical navigation simulators, space navigation simulators, etc.), and/or image/sensor data processing systems operating in physical (e.g., non-simulated) environments.

Additionally, although process 100 and other examples herein are described in reference to generating and using simulation radar data, it can be understood from the context of this disclosure that similar or identical techniques can be implemented for different simulated sensor types and sensor data modalities. For instance, similar techniques to those described herein can be used to capture and store lidar data based on sensor data captured by lidar sensors in a real-world physical environments, and then using the stored lidar data (e.g., object lidar data and/or environment background lidar data) to generate simulation lidar data for use in synthetic simulations. Additionally or alternatively, similar techniques can be used to capture and store video data, image data, audio data, sonar data, etc., based on real-world sensor data captured in a physical environment, and to generate simulation sensor data for simulated cameras, microphones, sonar sensors, and the like.

At operation 104, the simulation system 102 may receive sensor data associated with one or more physical environments. The sensor data received at operation 104 may include log data and/or sensor data captured by one or more vehicles operating in real-world driving environments. The sensor data captured at operation 104 may include any data relating to real-world objects detected within an actual environment (e.g., not a virtual or computer-generated environment), such as object types, sizes, positions, poses, velocities, etc., as well as data relating to the environment itself (e.g., weather conditions, road conditions, sun position, time, day, etc.). In some examples, the data received at operation 104 also may include data relating to the vehicle and/or sensors that captured the sensor data, such as a vehicle classification/type, position, pose, and velocity, sensor types and modalities, etc. Box 106 depicts an environment captured by sensors of a vehicle traversing a real-world environment. The environment shown in this example includes a number of static and dynamic objects, including a vehicle 108 directly in front of the vehicle that captured the sensor data. Although only a single environment is shown in this example, operation 104 may include the simulation system 102 receiving sensor data from captured any number of vehicles (or other sensor systems) within any number of different environments, in which each set of sensor data represents a different configuration of objects, different environment attributes, and the like. In some instances, the simulation system 102 may maintain a library of log data received from a number of vehicles in a fleet.

At operation 110, the simulation system 102 may determine and store the object radar data associated with one or more objects detected in the sensor data received in operation 104. Additionally or alternatively, the simulation system 102 may determine and store the background radar data (e.g., not object-specific radar data) associated with one or more environments in which the radar data was captured. As shown in box 112, the simulation system 102 may use various object detection techniques to identify object radar data 114 representing objects detected within the sensor data, and separate background radar data 116 associated with physical environments. The simulation system 102 may store the object radar data 114 and background radar data 116 within a simulation radar data store 118, which may include one or more separate data stores designed to store radar data and associated attributes.

To determine object radar data 114 associated with objects (e.g., vehicle 108) in the received sensor data, the simulation system 102 may perform one or a combination of various object detection techniques. In some examples, the simulation system 102 may use sampling (e.g., random sampling) from the corpus of log data received in operation 104 to determine log data sources, files, frames, and objects. For instance, in operation 110 the simulation system 102 may randomly select a log file received from an autonomous vehicle, randomly select a frame within the log file, and randomly select an object within the frame on which to perform the object detection techniques. The simulation system 102 may perform similar or identical random sampling processes any number of times to populate the simulation radar data store 118 with object radar data 114. In such examples, the use of random sampling to select objects may generate a library of object radar data 114 within the simulation radar data store 118 that is diverse and also representative of the actual objects encountered in the environment. Thus, using random sampling to select objects in operation 110 may provide technical advantages in some examples, resulting in synthetic simulations that provide realistic object data that is representative of the environments from which the sensor data was captured.

The simulation system 102 may use various object detection models and/or other automated techniques in operation 110 to detect objects, determine associated radar data, and determine various attributes (e.g., size, shape, pose, type, velocity, etc.) of the objects detected within the sensor data. For instance, the simulation system 102 may use semantic and/or instance segmentation to detect and distinguish objects within an environment based on sensor data. Various techniques for performing image-based semantic and instance segmentation can be found, for instance, in U.S. Pat. No. 10,535,138, filed Nov. 21, 2017, issued Jan. 14, 2020, and titled "Sensor Data Segmentation," and in U.S. Pat. No. 10,817,740, filed Jun. 20, 2018, issued Oct. 27, 2020, and titled "Instance Segmentation Inferred From Machine Learning Output," both of which are incorporated by reference herein, in its entirety for all purposes. In some cases, the simulation system 102 may determine object classes (or types) for an object (e.g., object 106) detected in the environment. Examples of techniques for performing image-based object classification can be found, for example, in U.S. patent application Ser. No. 16/587,605, filed Sep. 30, 2019, and titled "Perception System, in U.S. patent application Ser. No. 16/726,097, filed Dec. 23, 2019, and titled "Pedestrian Object Detection Training," in U.S. patent application Ser. No. 16/797,656, filed Feb. 21, 2020, and titled "Combined Track Confidence And Classification Model," and in U.S. patent application Ser. No. 16/457,524, filed Jun. 28, 2019, and titled "Head Detection For Improved Pedestrian Detection, each of which is incorporated by reference herein, in its entirety for all purposes. Further, in some cases, the simulation system 102 may perform object tracking for objects detected in the environment. Examples of various techniques for analyzing image data and/or multi-model sensor data to perform object tracking using trained machine-learned models can be found, for example, in U.S. patent application Ser. No. 16/866,865, filed Jan. 31, 2020, and titled "Object Detection And Tracking," and in U.S. Pat. No. 10,671,076, filed Dec. 6, 2017, issued Jun. 2, 2020, and titled "Trajectory Prediction Of Third-Part Objects Using Temporal Logic And Tree Search," each of which is incorporated by reference herein, in its entirety for all purposes. Additionally, the simulation system 102 may generate bounding boxes (and/or bounding contours for the objects detected within the sensor data. Examples of techniques for determining bounding boxes and/or bounding contours based on sensor data can be found, for example, in U.S. Pat. No. 10,733,441, filed May 23, 2019, issued Aug. 4, 2020, and titled "Three Dimensional Bounding Box Estimation From Two Dimensional Images," U.S. Pat. No. 11,010,907, filed Nov. 27, 2018, issued May 18, 2021, and titled "Bounding Box Selection, U.S. patent application Ser. No. 17/138, 710, filed Dec. 30, 2020, and titled "Collision Avoidance Using An Object Contour," and in U.S. patent application Ser. No. 17/138,751, filed Dec. 30, 2020, and titled "Object Contour Determination," each of which are incorporated by reference herein, in its entirety for all purposes.

Using any combination of object perception techniques, including but not limited to object/instance segmentation, object detection and classification, object tracking, bounding box generation, etc., the simulation system 102 may determine individual objects within the sensor data received in operation 104. Then, based on the detection of individual objects when the sensor data, the simulation system 102 may determine the radar data associated with the individual objects, and may store the object radar data 114 in the simulation radar data store 118. In various examples, the simulation system 102 may use only the radar data portions of the sensor data, or may use any combination of sensor data modalities (e.g., lidar data, radar data, image data, etc.) received in operation 104 to determine the presence, boundaries, and/or attributes of individual objects in the environment. In some cases, when the simulation system 102 cannot determine an object in the sensor data (or the boundaries of the object) with a sufficient level of confidence, the radar data for the object may be excluded from being stored in the simulation radar data store 118. For instance, when an object is detected nearby other objects in the sensor data, the simulation system 102 may determine that the certain radar points attributable to the object may be affected by or indistinguishable from the radar points from the other objects. In such examples, the simulation system 102 may determine that the radar data associated with the object is not to be captured or stored in the data store.

In some examples, the simulation system 102 may determine the object boundaries (e.g., a bounding box or bounding contours) of an object in the sensor data, and may collect any radar data points within the object boundaries and store the radar points as the associated object radar data 114. In some instances, the simulation system 102 also may determine a buffer region around the bounding box or bounding contours of the object, and may collect the radar data points within the object boundaries and the buffer region, to be stored as the associated object radar data 114 for the object. In still other examples, the simulation system 102 may perform a density-based clustering algorithm on the radar data within the region of the sensor data frame associated with the object, to determine a radar point cloud associated with the object.

When using techniques for determining object radar data that include collecting all of the radar data points within the region associated with the object, the resulting radar data may potentially include additional background radar data points and/or radar data points associated with other nearby objects. Therefore, in some cases, the simulation system 102 may determine and exclude background radar data points and/or radar data points caused by other objects. To determine the set of background radar data points and/or radar data points from other objects, the simulation system 102 may compare the radar data in the relevant region associated with the object in multiple different sensor data frames. For example, the simulation system 102 may analyze the radar data from a second log data frame in which the object is at a different location (e.g., a different region in the frame or absent from the frame). The simulation system 102 may use the radar data from the second frame to determine the background radar data and/or radar points attributed to other objects, and may subtract these radar data points from object radar data collected from the first log data frame.

After determining the radar data associated with a real-world object in a physical environment, the simulation system 102 may store the object radar data 114, along with a number of attributes of the object, in the simulation radar data store 118. The object radar data may be stored as a radar point cloud or cluster, or any other set of radar data points. For each radar data point associated with the object, the stored object radar data 114 may include a range value, radar cross-section (RCS) value, an azimuth value, an elevation value, and/or a doppler frequency value. Along with the object radar data 114 associated with an object, the simulation radar data store 118 may store any number of object attributes for the corresponding object, such as the object classification, position, pose, size, and/or distance from the sensor. Additional attribute data stored for the object may include the color, linear or angular velocity, linear or angular acceleration, and/or occlusion data associated with the object.

In some examples, the simulation system 102 may modify the object radar data 114 and/or the associated object attributes stored in the simulation radar data store 118. Such modifications may include removing certain data fields and/or discretizing radar data elements or object attributes into a discreet number of values ranges. These modifications may provide advantages of both reducing the size of each object entry in the simulation radar data store 118, and in reducing the dimensionality of the library of object radar data entries in the simulation radar data store 118, thereby lowering the total number of entries of object radar data 114 stored in the simulation radar data store 118. For example, for radar data fields having low resolution and/or high noise levels (e.g., angular resolution, position resolution, range, etc.), the corresponding object attributes may be discretized into relatively large value ranges thereby reducing the number of object entries that are required to be stored in the simulation radar data store 118. For instance, discretizing an object angle attribute into ranges of five degrees may reduce the size of simulation radar data store 118 by a factor of five in comparison to storing object angle attributes at one-degree increments.

Additionally, the simulation system 102 may discard one or more data fields from the received object radar data 114, and need not store those radar data fields in the simulation radar data store 118. In some examples, the simulation system 102 may store a limited subset of data fields received in the radar sensor data for each radar point, rather than the entire radar data received from the vehicle log data for the object. For instance, the simulation system 102 may store, for each radar point, data including the radar cross-section (RCS) value, signal-to-noise ratio (SNR) value, and three position fields (e.g., x-position value, y-position value, yaw value). However, in this example, the simulation system 102 may discard and need not store additional data fields for each radar point within the simulation radar data store 118, including the speed data, doppler data, standard deviation data, angular velocity data, and/or data associated with other non-main detections (e.g., hypothetical or alternative detections) within the radar data. Certain data dimensions within the object radar data 114 may be discarded and need not be stored in the data store, because those data dimension values may be specified in the simulation data when a new simulated object is to be generated. Additionally, other data dimensions within the object radar data 114 may be discarded and need not be stored in the data store, when determined by the simulation system 102 to be less relevant (or irrelevant) as input to neural network models trained to generate and analyze top-down representations of the environment. For instance, the simulation system 102 may discard certain radar data fields (e.g., elevation, angular velocity), and/or other attribute data (e.g., object class, object model, object color, etc., that are not relevant to the trained models that will receive the object radar data 114 and attribute data as inputs.

As can be understood from these examples, increasing the number of data fields stored for each object radar data in the simulation radar data store 118 and/or increasing the resolution of any of these data fields may provide advantages of more realistic or robust synthetic simulations, but also may increase the number of object entries required to be stored in the simulation radar data store 118 to assure that all possible synthetic scenarios can be simulated. In contrast, limiting the number of data fields stored for each object radar data in the simulation radar data store 118 and/or decreasing the resolution of any of these data fields may provide advantages in reduction of data store size and improved system performance, but may limit the robustness of the synthetic simulations. Accordingly, in some examples, an optimal dimensionality of the simulation radar data store 118 and/or optimal discretization ranges may be determined to retain the most relevant data used by the trained neural network models during the simulations. For instance, the dimensionality of the simulation radar data store 118 may be limited in some cases to any combination of the following relevant data fields: object range, yaw, azimuth, speed (e.g., one-dimensional), bounding box width, and bounding box height, while less relevant data fields (e.g., RCS data, angular velocity, object class, color, model, etc.) may be discarded from the simulation radar data store 118.

The simulation system 102 also may store background radar data 116, separate from the object radar data 114, representing the radar background of one or more physical environments. In some cases, unlike the object radar data 114, the background radar data 116 may include a set of radar data points covering the entire field of view of a radar sensor. In other cases, the background radar data 116 might not cover the entire field of view of a radar sensor, but may cover at least a region of sufficient size to cover the object radar data 114 and/or a buffer region around the object radar data. For instance, background radar data 116 may be captured based on one portion of physical environment without any radar-detectable objects, or in which the radar data attributable to any objects can be identified and extracted out from the radar sensor data with a sufficient level of confidence. Additionally, as described below in more detail, the simulation system 102 may capture background radar data 116 corresponding to physical environments with fewer objects (or no objects) present in the environment. The background radar data 116 may include separate radar point clouds and/or radar point data sets, and also may be associated with a set of environment attributes stored in the simulation radar data store 118. The simulation system 102 may use any combination of the sensor data analysis techniques described herein to determine environment attributes such as environment type (e.g., driving scenario type), region, driving conditions, weather conditions, temperature, light conditions, etc. The environment attributes then may be stored with the associated background radar data 116 in the simulation radar data store 118. Some examples herein include storing and using object radar data 114 and background radar data 116, both of which may be captured from actual radar data within vehicle log data representing real-world objects. In other examples, the object radar data 114 may include real-world radar point clouds captured via sensor data, while the background radar data 116 may be non-real-world data that is programmatically generated using algorithmic and/or random background radar generation procedures. In other cases, the background radar data 116 may include background radar data captured via sensors in real-world environments, while some or all of the object radar data 114 may include programmatically generated object radar point clouds, etc.

At operation 120, the simulation system 102 may receive simulated object data associated with a synthetic simulation to be generated. As described above, when generating a synthetic simulation the simulation system 102 may programmatically generate a simulated environment and a driving scenario for the simulation. The driving scenario may define a number of static and/or dynamic objects to be rendered within the synthetic simulation, and each simulated object may have a set of parameters defining the attributes and/or behaviors of the object. For example, at operation 120 the simulation system 102 may receive data identifying a number of simulated objects to be rendered during a synthetic simulation, the data including object classifications, positions, sizes, poses, velocities, material compositions, and the like for each simulated object. Box 122 depicts an example simulation object data table that may include any combination of attributes for the simulated objects to be rendered in the synthetic simulation. Additionally, for each simulated object in a synthetic simulation, the attributes also may be associated with a particular time (or range of times) in the simulation. While some attributes may change for a simulated object as the simulation progresses (e.g., position, pose, velocity, etc.) other attributions for a simulated object may be constant throughout the simulation (e.g., object classification, size, etc.).

At operation 124, the simulation system 102 may determine object radar data and/or background radar data to be used in a synthetic simulation, based on the simulation data and simulated object data received in operation 120. As described above, a simulation radar data store 118 (or separate data stores) may store object radar data 114 including real-world radar point clouds collected from sensor data, along with associated object attributes. In some examples, the simulation system 102 may use the simulated object attributes received in operation 120, to determine a matching object (e.g., an object with matching attributes) in the simulation radar data store 118. As shown in box 126, the simulation system 102 then may retrieve the associated object radar data 128 for the matching object from the simulation radar data store 118, to be used as the radar data for the simulated object in the synthetic simulation.

As noted above, the simulation system 102 may discard and/or discretize certain radar data fields and/or attributes when storing object radar data 114 in the simulation radar data store 118. In such cases, the simulation system 102 may perform corresponding data modifications to the attributes of the simulated objects, such as discretizing attribute values into ranges to determine a matching object in the simulation radar data store 118. In some examples, the simulation radar data store 118 may store multiple objects having the same or overlapping attribute data, in which case the simulation system 102 may select the object having the closest matching attributes in operation 124.

The simulation system 102 also may determine background radar data in operation 124, based on the attributes of the simulated environment for the requested synthetic simulation. When simulated environment attributes are received or determined in operation 120, the simulation system 102 may use the environment attributes in the simulation radar data store 118 to determine matching background radar data. As shown in box 126, the simulation system 102 then may retrieve the matching background radar data 130 for the simulated environment from the simulation radar data store 118. For instance, a synthetic simulation of a scenario within a particular environment type, region, driving conditions, weather conditions, and the like, may be matched to radar background in the simulation radar data store 118 having similar or identical associated environment attributes.

At operation 132, the simulation system 102 may generate simulation radar data for use in the synthetic simulation, based on the object radar data and/or background radar data determined in operation 124, and/or based on a combination of the object radar data and background radar data. In some examples, the simulation radar data may include object radar data only, for one or more simulated objects. In other examples, the simulation radar data may include object radar data combined with background radar data. For instance, box 134 depicts an example of background radar data combined with two radar point clouds representing simulated objects, that have been overlayed on the background radar data. As described below in more detail, combining object radar data and background radar data may include regions with the background radar data on which to overlay the object radar data, so that radar data points from the object radar data and background radar data both occupy the same overlay region. In various examples, the simulation system 102 also may use one or more probabilistic merging techniques, in which various probabilities are applied to the data points of the radar object radar data and the background object data, within one or more overlay regions, to determine the resulting set of radar data points to be included in the simulation radar data.

After generating the simulation radar data, the simulation radar data may be provided as input during the synthetic simulation to the simulated radar sensors of a simulated vehicle. As described above, the synthetic simulation may include the simulated vehicle executing trained perception models based at least in part on simulation radar data, and controlling the simulated vehicle based on the outputs of the trained perception models. When using the techniques described herein, the simulation radar data provided to the trained perception models may include actual radar sensor data collected from log data representing real-world objects. As a result, the outputs of the trained perception models may be more accurate and realistic, thereby allowing for improved testing and validation of the features and functionalities of the simulated vehicle controllers.

Figure 2:
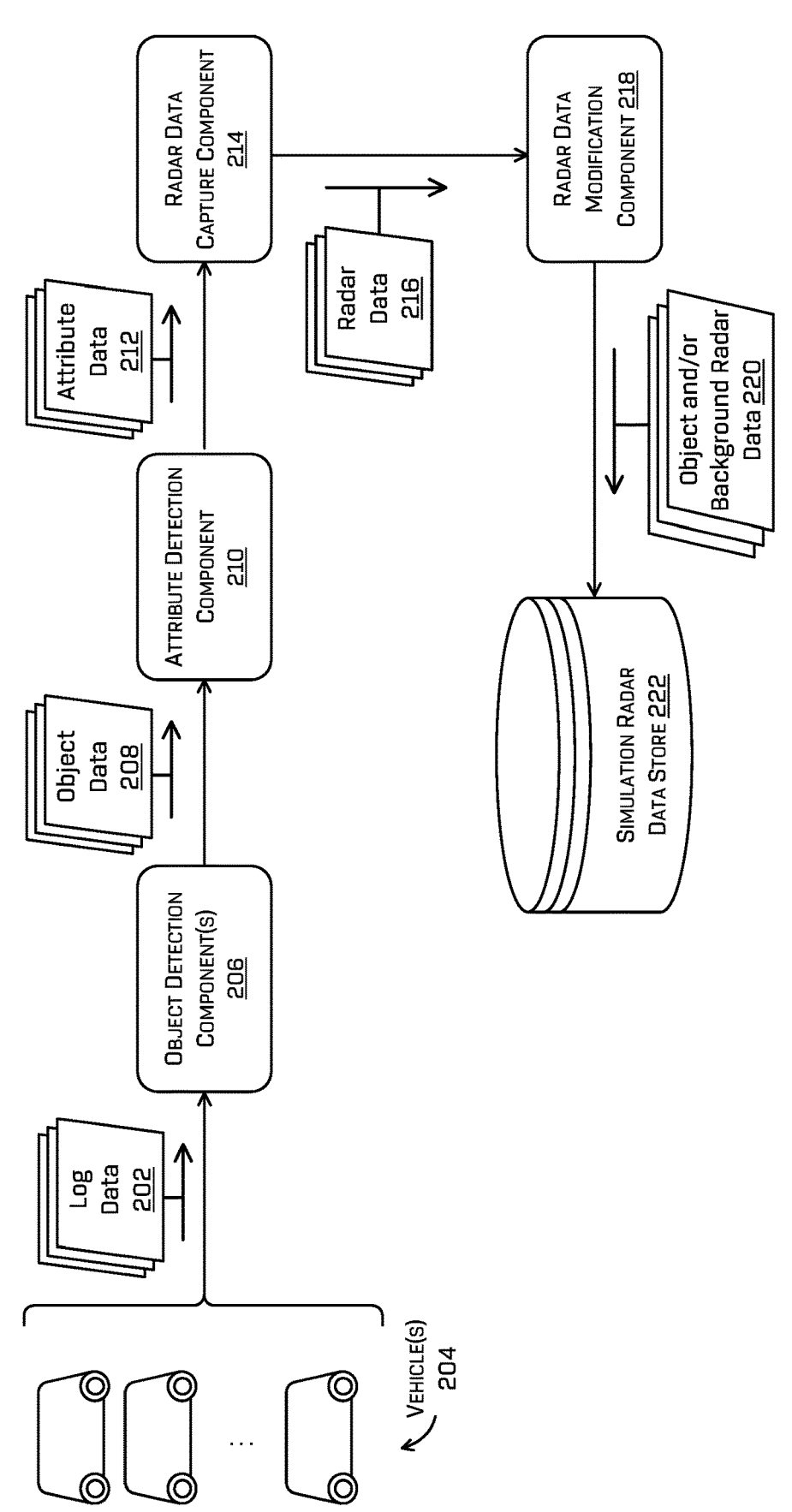
FIG. 2 depicts a system including components configured to generate simulation radar data based on log data captured by vehicles in an environment, in accordance with one or more examples of the disclosure.

FIG. 2 is an example block diagram illustrating an example architecture 200 of a simulation system 102 configured to generate and store simulation radar data based on log data 202 captured by one or more vehicles 204. As discussed above, synthetic simulations using real-world radar point clouds associated with simulated objects and/or real-world background radar data may improve the efficacy of the simulations, thus improving the overall vehicle safety and efficiency of autonomous vehicles when encountering new or unexpected situations. In the current example, log data 202 may be received from one or more vehicles 204 operating on various roadways in real world conditions and environments. As discussed above the log data 202 may include sensor data, perception data, prediction data, trajectory information, and the like.

The log data 202 may be processed by an object detection component 206. The object detection component 206. In some examples, the object detection component 206 may determine the existence of objects within each of a number of discrete log data files, frames, and/or regions within the log data 202. For example, one or more objects may be present in a particular region of the log data 202. The object detection component 206 may then determine or identify a classification or type associated with each object in each region of the log data, and may extract (or determine) parameters associated with each object. For example, for a vehicle object detected within the log data 202, the object detection component 206 may determine parameters such as a current drive mode, current drive state, planned maneuver, total velocity, total acceleration, longitudinal acceleration, lateral acceleration, distance to an intersection, longitudinal acceleration, lateral acceleration, yaw, yaw rate, lane identifier, road identifier, Euclidian position, and the like. The object detection component 206 also may perform log data filtering in some examples, in which log data 202 corresponding to different time intervals is filtered to one or more trained models to determine arrangements of objects, parameters, and object states relative to the vehicle 204 that captured the log data 202. In some cases, log data filtering may be performed to remove or prevent non-relevant or impossible/improbable data (such as log data representing physically impossible parameters) from being incorporated into the downstream scenario representations and models.

In some examples, the object detection component 206 may generate top-down scenario representation associated with the log data 202, which may include vectorized data defining representative object data 208 in the scenario. In some cases, the top-down scenario representation may comprise parameters associated with the vehicle itself, and features of any agents within the scenario and/or the physical environment from which the log data 202 was generated. The object data 208 may be incorporated into a top-down scenario representation including image(s) (and/or other types of encodings or representations) that represent the environment of the log data 202 at time T-N, and may include one or more bounding boxes representing the locations and extent (e.g., length and width) of the objects in the object data 208 at the indicated times. Further, the top-down scenario representation can include a bounding box representing the autonomous vehicle, and/or other object data 208 in the environment. As can be understood, top-down scenario representation may include any number of static objects (e.g., buildings, trees, curbs, sidewalks, map elements, etc.) or dynamic objects (e.g., agents) in the environment at any time, and is not limited to one agent/bounding box.

The object data 208 may be processed by an attribute detection component 210 configured to determine attribute data 212 associated with one or more objects detected within the log data. As described above, the attribute data 212 may include various object attributes (e.g., object types or classifications, positions, sizes, poses, velocities, material compositions, etc.). The attribute detection component 210 may determine object attributes based on any combination of the techniques described herein, using multi-model sensor data (e.g., image data, lidar data, radar data, etc.) within the log data 202. In some examples, the attribute detection component 210 may use a top-down representation of the environment as described above, to determine various object attributes (e.g., size, pose, yaw, velocity, etc.).

The radar data capture component 214 may determine radar data 216, such as radar point cloud or cluster, associated with any objects detected within the log data 202 and/or associated with a background environment within the log data 202. In some cases, the radar data capture component 214 may use the attribute data 212 (e.g., object type, material, bounding box size, etc.) to define the boundaries within which to collect radar data points associated with the object. As described above, the radar data capture component 214 also may collect radar data points within a buffer region around the object in some cases, and/or may perform a density-based clustering algorithm to determine the radar point cloud associated with the object data 208 and attribute data 212 for an object.

The radar data modification component 218 may be configured to modify the background radar data 116 into modified radar data 220 to be stored within a simulation radar data store 222. The simulation radar data store 222 in this example may be similar or identical to the simulation radar data store 118 described above in FIG. 1. As discussed above, the simulation radar data store 222 may be an N-dimensional space configured to store one or more entries with object radar data for each possible combination of the N object attributes stored in the data store. In various examples, the radar data modification component 218 may modify the background radar data 116 by removing certain data fields (e.g., radar data point components and/or object attributes) which are less relevant (or irrelevant) to the trained models used during the synthetic simulations, and/or by discretizing certain fields to reduce the size and dimensionality of the simulation radar data store 222. As described above, the modified radar data 220 may include object radar data and associated object attributes for one or more objects detected within the log data 202. The modified radar data 220 also may include background radar data, separate from the object radar data, including background attributes associated with the real-world environment within which the log data 202 was captured. The object radar data and background radar data may be stored, within a single simulation radar data store 222 (e.g., database, file system, or other data structure) or within separate data stores.

Figure 3:
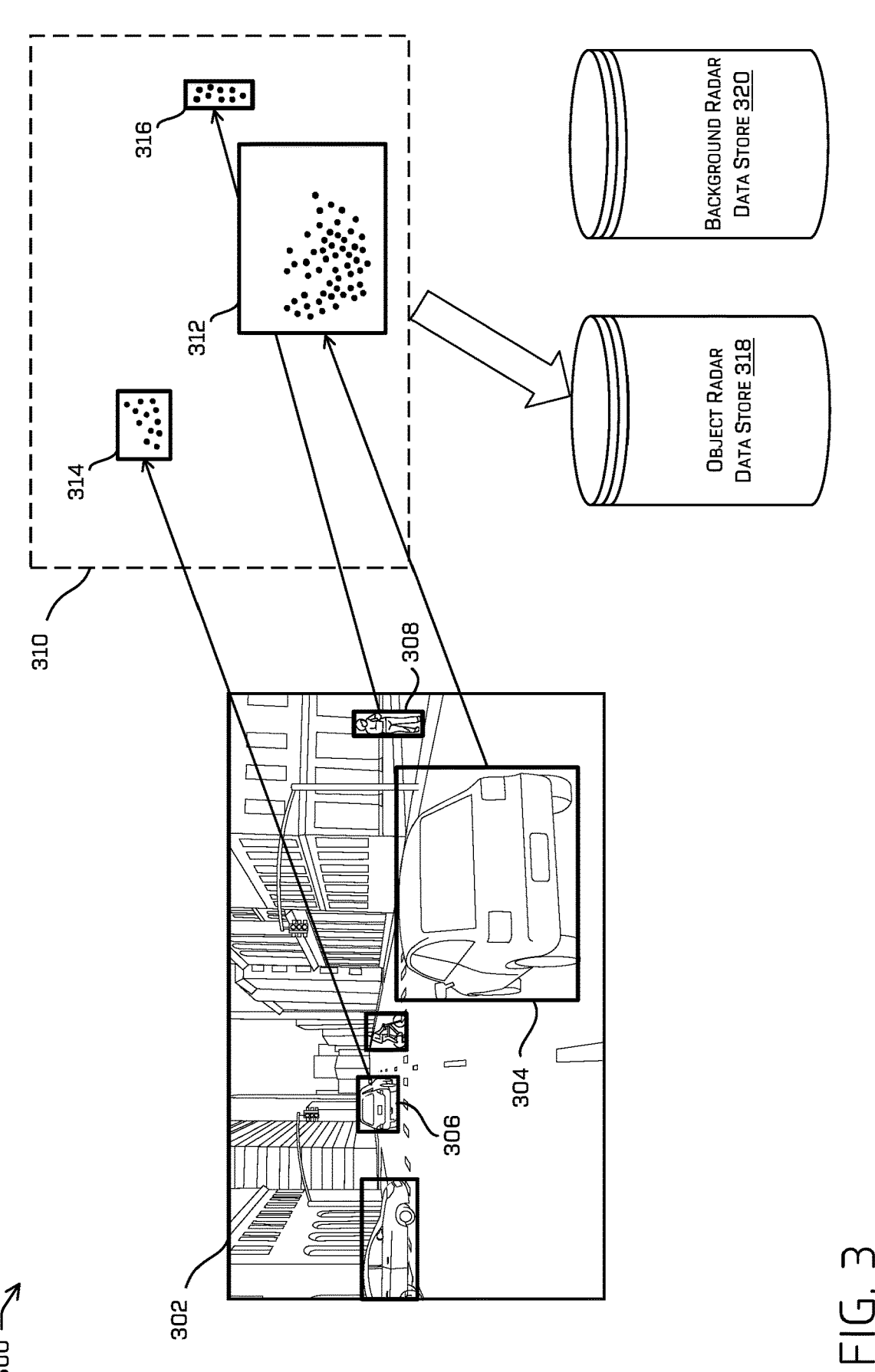
FIG. 3 depicts a technique for determining and storing object radar point clouds associated with objects detected in an environment, in accordance with one or more examples of the disclosure.

FIG. 3 depicts a diagram 300 illustrating a technique for determining object radar data for a number of objects detected based on sensor data of a real-world environment, and storing the object radar data for the objects within a data store. In this example, a representation of a driving scene 302 is depicted based on sensor data captured within a real-world environment. The driving scene 302 may be captured by the sensors of an autonomous vehicle (and/or any other sensor system) operating within a physical environment. In some cases, the driving scene 302 may be extracted by a simulation system 102 from a log data file received from a vehicle. Although the driving scene 302 is depicted as image data, the sensor data captured by the vehicle may include sensor data captured by sensors of any different sensor type and/or sensor data modality (e.g., lidar data, radar data, image data, etc.).

In this example, the simulation system 102 may be configured to analyze the driving scene 302 and determine object radar data for one or more objects within the driving scene. As noted above, the driving scene 302 may be selected based on sampling (e.g., random or non-random sampling) perform by the simulation system 102. For instance, to receive the sensor data for the driving scene 302, the simulation system 102 may randomly sample a vehicle and/or log file from which to request log data, a frame or timestamp within the log file, a frame region within the frame, and/or object(s) within the frame region. In this example, a number of different objects are depicted within the driving scene 302, including a vehicle 304, a vehicle 306, a pedestrian 308, and a number of other objects.

The simulation system 102 may select none, some, or all of the objects within the driving scene 302 on which to determine and store associated object radar data. For instance, the simulation system 102 may select certain objects (e.g., vehicle 304 and pedestrian 308) to determine and store object radar data, and other objects (e.g., vehicle 306) not to determine and store object radar data. Such determinations may be made by the simulation system 102 based on the quality of the radar data that can be collected for the objects (e.g., a clear radar point cloud, consistent background radar, a lack of other nearby objects, etc.), and/or based on the number of other object entries in the data store having similar or matching object attributes.

In this example, the simulation system 102 extracts object radar data 310 from the sensor data associated with the driving scene 302, including radar point clouds 312-316 corresponding to the objects 304-306. The simulation system 102 may perform various techniques to determine the radar point clouds 312-316 associated with the objects 304-306. In some cases, the simulation system 102 may determine bounding boxes (or bounding contours) for each of the objects 304-308 based on the multi-model sensor data of the driving scene (e.g., image data, lidar data, radar data, etc.). After determining the bounding boxes, the simulation system 102 may collect the sets of radar data points within the bounding box for each object, and/or within buffer regions surrounding the bounding box for each object. Additionally or alternatively, the simulation system 102 may perform a density-based clustering algorithm to determine the radar points associated with each of the objects 304-308. The resulting radar point clouds may be stored as radar point clouds 312-316 which can be stored in the object radar data store 318 with a number of associated object attributes for their respective objects. The radar data shown in various examples described herein, including both object radar data and/or background radar data, can be stored and represented using a combination of techniques and from different perspective angles. For instance, radar data representing objects and/or backgrounds may be converted into points within a top-down representation of an environment, an object flat plane representation of an environment, and/or a 3D perspective view of the environment. In some examples, 3D radar may be used wherein radar data includes attributes of azimuth, range, and doppler/instantaneous velocity. Such data may be more readily represented as a top-down representation in a scene. In examples 4D radar date may be used which includes a height dimensions and may be more easily represented in 3D space. In either way, a transformation may be applied (such as with other modalities) to represent the radar data in 2D (e.g., a top-down perspective) or 3D space.

The simulation system 102 may attempt to determine and remove background radar data points, and/or radar data points attributable to other objects, from the radar point clouds 312-316. For example, to remove radar data points that are not attributable to the pedestrian 308, the radar point clouds 312-316 may analyze the driving scene 302 using a different frame of the log data where the pedestrian 308 is either not in the frame or in a different region of the frame. When such a frame can be identified, the simulation system 102 may analyze the radar data in the corresponding region of the frame to determine the background radar data and/or radar data attributable to other objects, and then may extract those radar data points from the radar point cloud 316.

Figure 4:
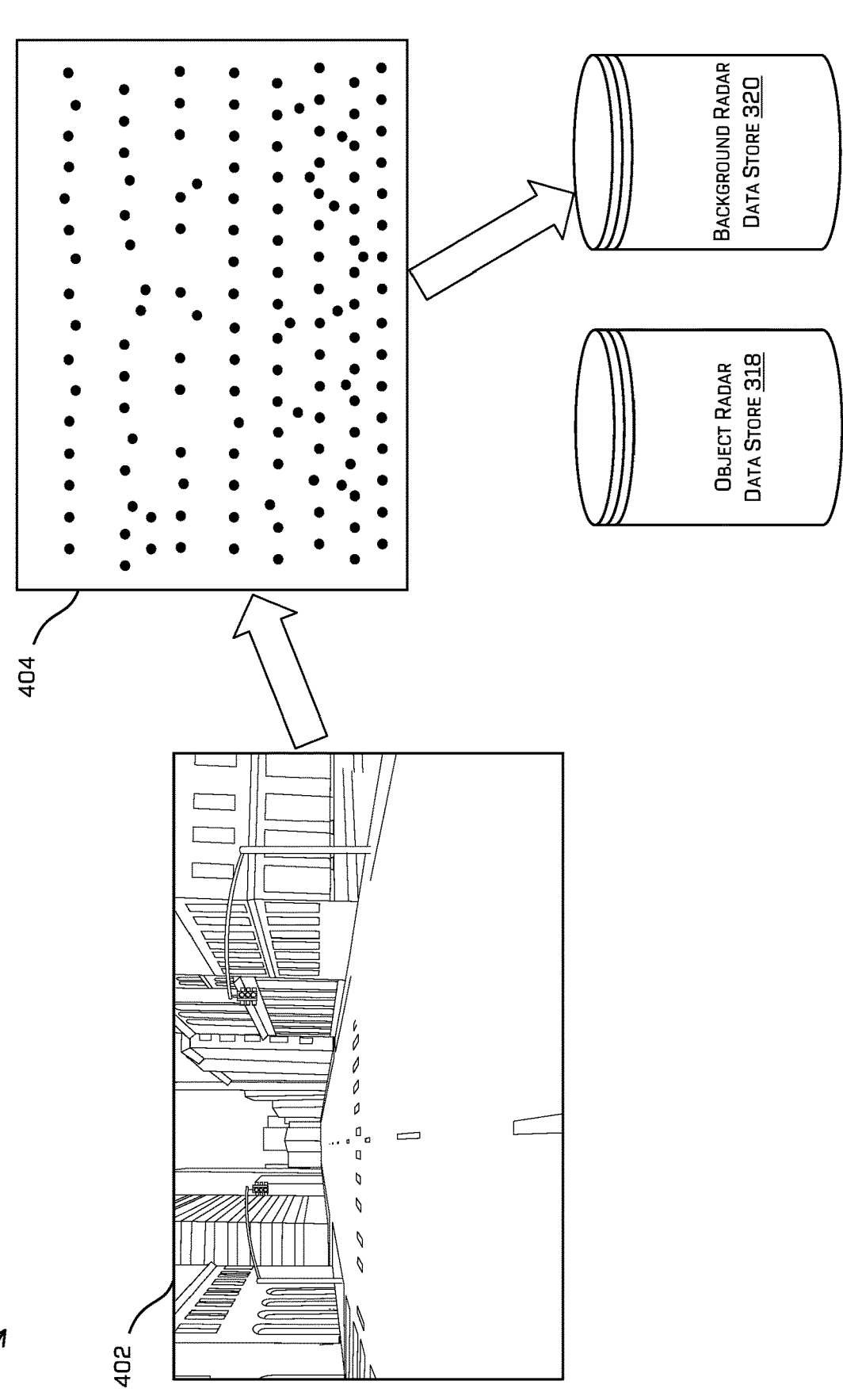
FIG. 4 depicts a technique for determining and storing background radar point clouds associated with a detected environment, in accordance with one or more examples of the disclosure.

FIG. 4 depicts a diagram 400 illustrating a technique for determining background radar data based on sensor data of a real-world environment, and storing the background radar data within a data store. In contrast to FIG. 3 in which the simulation system 102 determined object radar data, in this example the simulation system 102 may determine background radar data based on a driving scene 402 in which no objects are present. In some cases, the simulation system 102 may sample and/or search the log data to identify one or more scenes of various driving scenarios (e.g., highway scenarios, city scenarios, rural scenarios, etc.) and/or various driving conditions (e.g., weather conditions, lighting and temperature conditions, visibility conditions, etc.) having few or no objects within the driving scenes.

When the simulation system 102 detects a driving scene 402 without any objects likely to significantly affect the background radar data (e.g., nearby objects and/or metallic/reflective objects), the simulation system 102 may capture the radar data for the driving scene 402 and store the radar data as background radar data 404. As shown in this example, the size of the background radar data 404 may correspond to the size of the entire driving scene 402, or any portion there. In some cases, the simulation system 102 may collect all of the radar data points within the field of view of the radar sensor(s) used to capture the representation of the driving scene 402. After collecting the background radar data 404 based on the environment of the driving scene 402, the background radar data 404 may be stored (e.g., as a radar point cloud or radar point data set) in the background radar data store 320, along with the associated environment attributes (e.g., driving scenario type, driving conditions, etc.).

Figure 5:
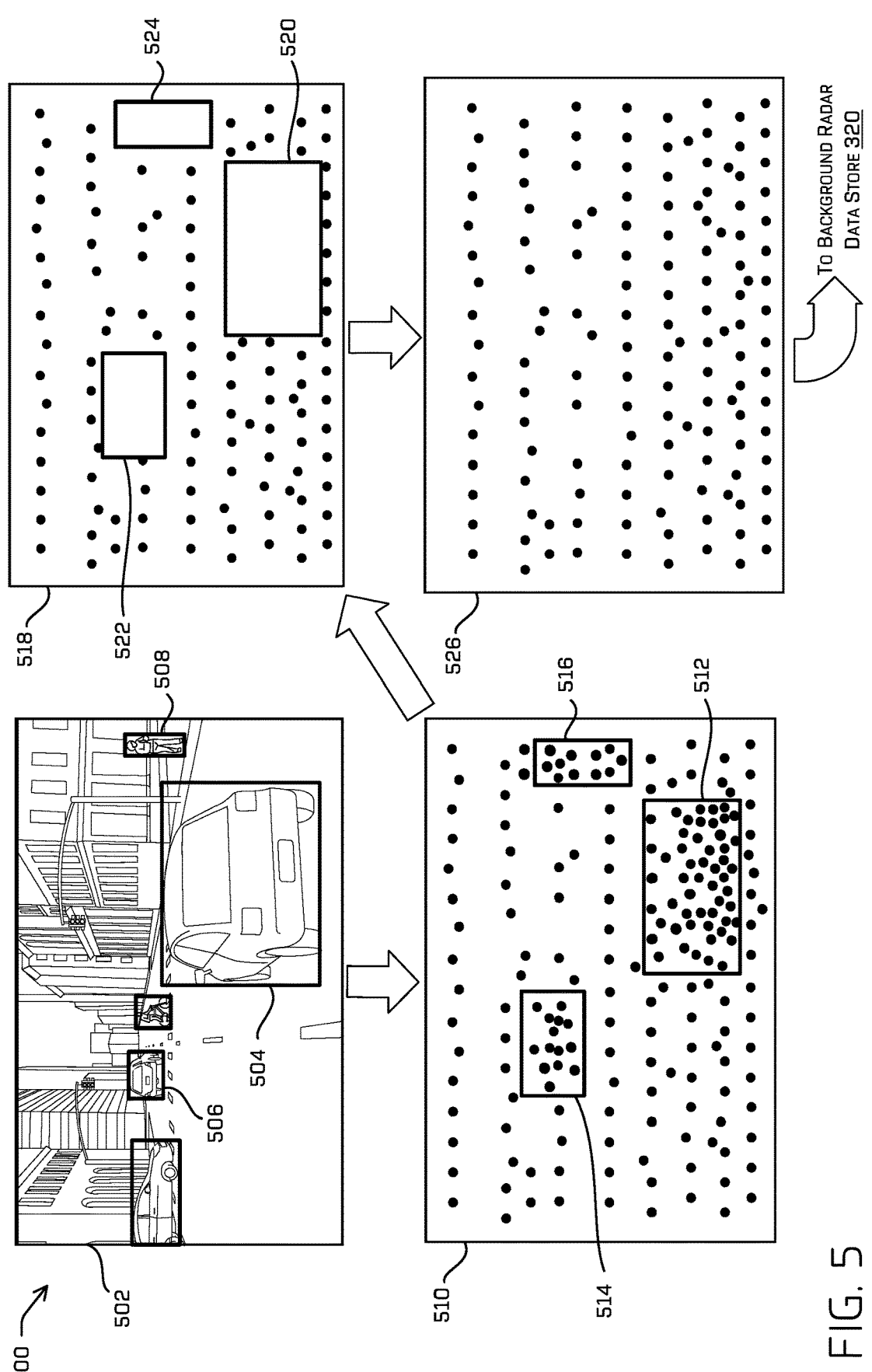
FIG. 5 depicts another technique for determining and storing background radar point clouds associated with a detected environment, in accordance with one or more examples of the disclosure.

FIG. 5 depicts a diagram 500 illustrating another technique for determining background radar data based on sensor data of a real-world environment, and storing the background radar data within a data store. Unlike the previous examples, this example illustrates a technique for background radar data based on driving scenes in which one or more objects (e.g., objects likely to affect the background radar data) are present. The driving scene 502 shown in this example may be similar or identical to the driving scene 302 described above. The driving scene 502 includes a number of detects objects, including a vehicle 504, a vehicle 506, and a pedestrian 508.

A radar data view 510 may represent the radar data associated with the driving scene 502. The radar data view 510 in this example may include radar data points attributable to the objects 504-508, and background radar data points that are not attributable to any objects in the driving scene 502. In this example, the simulation system 102 may use various techniques described herein to determine bounding boxes 512-516 within the radar data view 510 corresponding to the objects 504-508 in the driving scene 502. After determining the corresponding bounding boxes 512-516, the simulation system 102 may remove the radar points from these regions that are attributable to the objects 504-508.

In some examples, the simulation system 102 may generate an updated radar data view 518, in which all of the radar data points have been removed from the object bounding boxes 520-524. In these examples, after removing the radar data points from the bounding boxes 520-524, the simulation system 102 may determine sets of replacement radar data points for each of the bounding boxes 520-524. The replacement radar data points may be determined, for instance, by copying the radar data from a different region of the same radar data view 510 without any objects present in the region, and/or by copying the radar data from the same regions but at different frame/time in the driving scenario when the objects 504-508 no longer occupy those regions. In either example, the simulation system 102 may store the resulting radar data view 526, corresponding to the background radar data without the additional radar data attributable to the objects 504-508, in the background radar data store 320, along with the associated environment attributes (e.g., driving scenario type, driving conditions, etc.).

FIG. 6 depicts an example object radar data table 600 and an example background radar data table 602, including illustrative radar data and attributes associated with objects and/or environments detected based on sensor data of a real-world environment. As described above, the simulation system 102 may determine the dimensionality of the object radar data stored in the simulation radar data store 222, and/or may determine discreet value ranges for each data dimension, based on a desired optimization of data store size and improved system performance versus the robustness of the synthetic simulations. In this example, the object radar data table 600 includes an object identifier field 604, a radar point cloud link field 618, and six additional fields defining the dimensionality of the object radar data table 600 based on radar data fields and/or object attributes: an object range field 606, an object yaw field 608, an object azimuth field 610, an object speed field 612, an object bound box width field 614, and an object bounding box height field 616.

Similarly, the simulation system 102 may determine the dimensionality of the background radar data stored in the simulation radar data store 222, based on the desired optimization of data store size, improved system performance, and the robustness of the synthetic simulations. In this example, the background radar data table 602 includes a background identifier field 620, a radar point cloud link field 626, and two additional fields defining the dimensionality of the background radar data table 602 based on environment attributes: a driving simulation type field 622, and a driving conditions field 624.

Figure 7:
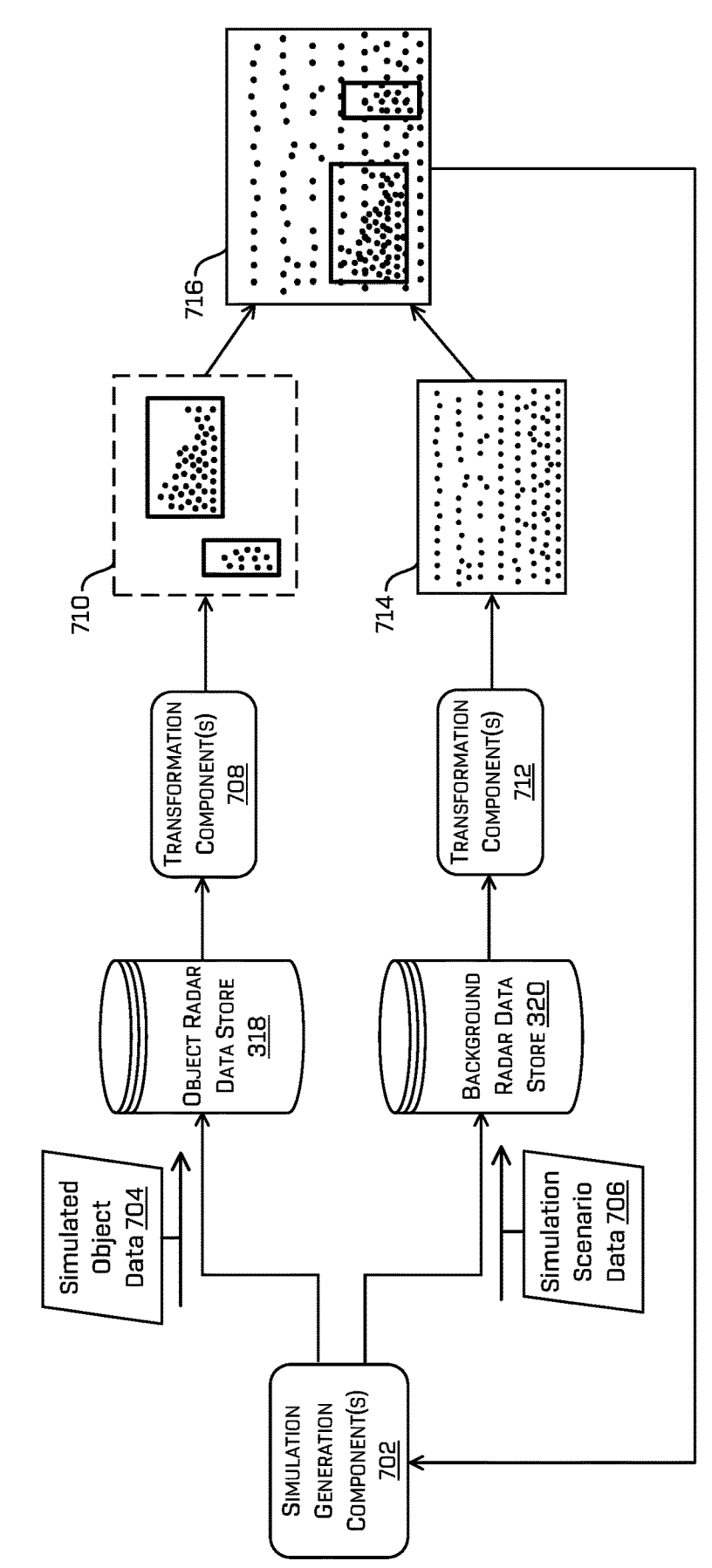
FIG. 7 depicts a technique of generating simulation radar data based on combined object radar data and background radar data, in accordance with one or more examples of the disclosure.

FIG. 7 is an example block diagram illustrating an example architecture 700 of a simulation system 102 configured to retrieve object radar data and background radar data based on simulation data for a synthetic simulation, and then generate simulation radar data for use in the synthetic simulation. As discussed above, synthetic simulations using real-world radar point clouds associated with simulated objects and/or real-world background radar data may improve the efficacy of simulations, thus improving the overall vehicle safety and efficiency of autonomous vehicles when encountering new or unexpected situations. In the current example, a simulation generation component 702 may determine simulation data for a synthetic simulation to be generated and executed by the simulation system 102. The simulation data determined by the simulation generation component 702 may include simulation object data 704 defining a number of simulated objects to be rendered within the simulation, as well as object attributes associated with the simulated objects. For example, for each simulated object to be rendered during the synthetic simulation, the simulated object data 704 may include the object classifications, positions, sizes, poses, velocities, material compositions, etc.

The simulation generation component 702 also may determine simulation scenario data 706 defining the driving scenario to be simulated and/or the attributes of the simulated environment. For example, the simulation scenario data 706 may include data defining the type and characteristics of the driving scenario to be simulated (e.g., highway scenarios, 4-way stop scenarios, crosswalk scenarios, etc.) and the driving conditions to be simulated during the synthetic simulation (e.g., weather conditions, lighting and temperature conditions, visibility conditions, etc.).

After determining the simulated object data 704 and the simulation scenario data 706 for the synthetic simulation, the simulation generation component 702 may retrieve a set of object radar data 710 and a background radar data view 714 from the object radar data store 318 and the background radar data store 320, respectively. For example, the simulation generation component 702 may query the object radar data store 318 to determine objects with attributes matching the attributes of the objects in the simulated object data 704. The simulation generation component 702 may retrieve the radar point clouds for the matching objects, from the object radar data store 318. In some examples, the simulation system 102 may use transformation component(s) 708 to transform the object radar data retrieved from the object radar data store 318 into the object radar data 710. For example, the transformation component(s) 708 may perform one or more linear transformations to change the position, angle, and/or scale of radar data retrieved from the object radar data store 318, based on differences in the position, pose/angle, and/or scale between the simulated object in the simulation object data 704 and the associated non-simulated object from which the object radar data was captured and stored in the object radar data store 318.

Similarly, the simulation generation component 702 may query the background radar data store 320 to determine background radar data with attributes matching the attributes of the simulation scenario data 706. The simulation generation component 702 may retrieve the radar point cloud for the matching background radar data view 714 from the background radar data store 320. When attributes of the background of the simulation scenario data 706 (e.g., weather conditions, time of day, ambient temperature, driving scenario type, numbers and types of background objects, etc.), do not correspond to the attributes of the background radar data retrieved from the background radar data store 320, the simulation system 102 may transform the background radar data using transformation component(s) 712. For instance, the transformation component(s) 712 may transform one or more data elements for any number of points in the retrieved background radar data 714, such as RCS values, SNR values, doppler values, etc. The transformations may be performed based on differences (e.g., individual or average differences) between the radar data retrieved from the background radar data store 320 and the simulation scenario data 706. In other examples, transformations may be performed based on differences between the radar data retrieved from the background radar data store 320 and the object radar data 710 with which the background radar data 714 is to be combined.

Finally, the simulation generation component 702 may generate the simulation radar data 716 for the synthetic simulation, based on the combination of the object radar data 710 and background radar data view 714. As shown in this example, the simulation generation component 702 may assemble the simulation radar data 716 by determining locations for each of the simulated objects within the background radar data view 714, and overlaying the radar point clouds in the object radar data 710 at the determined locations on the background radar data view 714. The simulation generation component 702 may use various techniques, individually or in combination, to generate the simulation radar data 716 based on the object radar data 710 and background radar data view 714. In some cases, the simulation generation component 702 may overlay the object radar data 710 onto the background radar data view 714, either by aggregating the radar points of the object radar data 710 and the background radar data view 714, or by replacing regions of the background radar data view 714 with the corresponding regions of the object radar data 710. Additionally, as described below in more detail, the simulation generation component 702 and/or other components within the simulation system 102 may perform a probabilistic merging technique in which radar data point subsets are determined probabilistically for both the object radar data 710 and the background radar data view 714, based on one or more overlay regions and probabilities defined for the overlay regions.

Figures 8A, 8B:
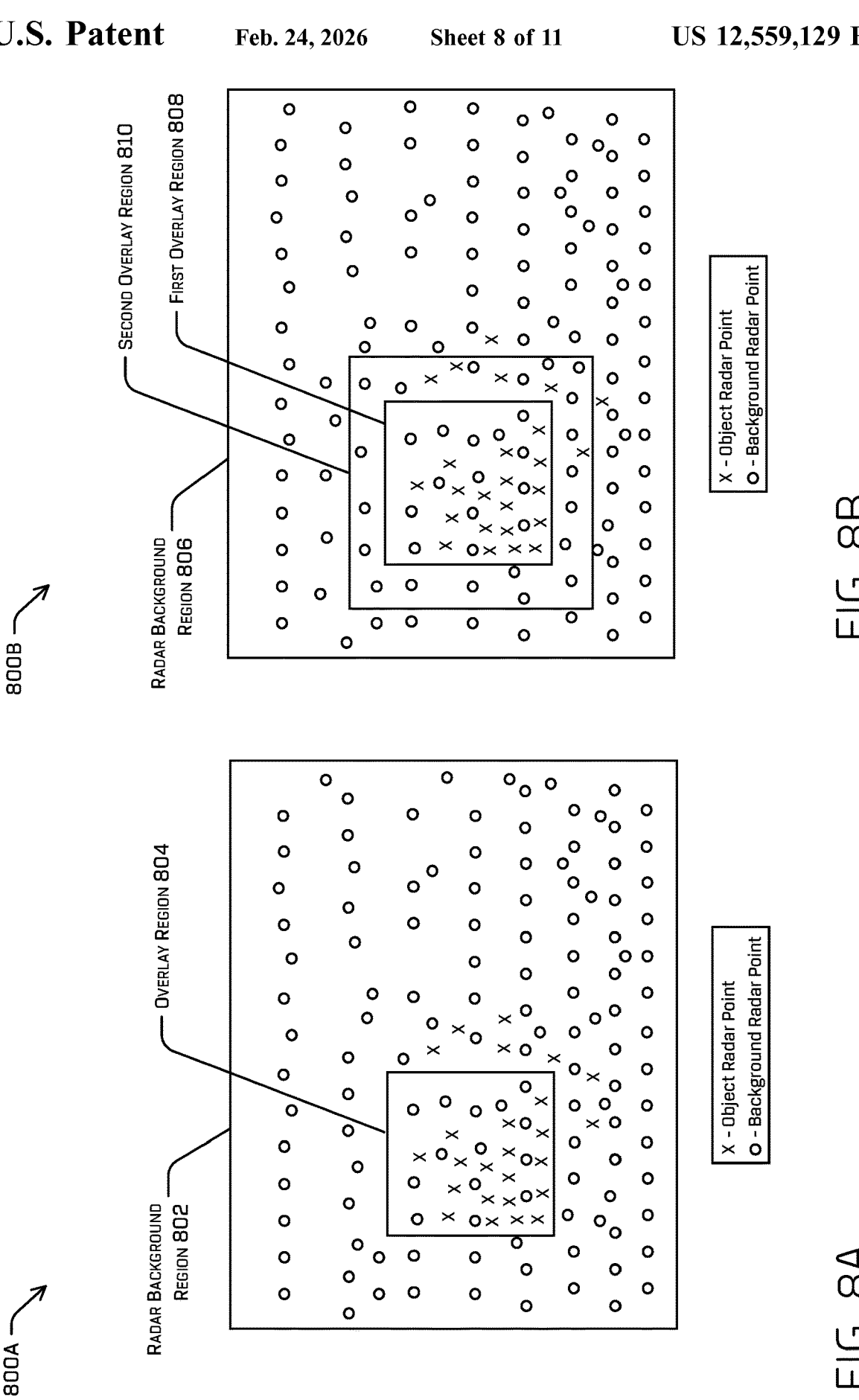
FIGS. 8A and 8B depict techniques of probabilistic merging object radar data and background radar data, in accordance with one or more examples of the disclosure.

FIGS. 8A and 8B depict two different techniques of performing probabilistic merging of object radar data and background radar data, to generate the simulated radar data for use in a synthetic simulation. As noted above, even when real-world radar point clouds are used to provide the radar data for simulated objects, certain trained perception models based on the radar data may provide aberrant outputs when the real-world object radar data has been not merged with real-world background radar data. Accordingly, FIGS. 8A and 8B illustrate two example techniques for probabilistically merging real-world radar point clouds representing simulated objects with real-world background radar data. As described below, diagram 800A in FIG. 8A illustrates a technique for using a single overlay region, and diagram 800B in FIG. 8B illustrates a technique for using multiple overlay regions. Both techniques may use probabilities to determine various subsets of the radar data points within the object radar data and background radar data to be retained or discarded within the overlay regions and/or outside of the overlay regions. In some examples, an overlay region need not be a multi-dimensional region but may be defined as a single point (e.g., a center point) around which a radar point cloud for an object can be added to the background region.

In FIG. 8A, diagram 800A illustrates a radar background region 802 containing an overlay region 804 associated with a simulated object to be rendered in a synthetic simulation. In this example, each "X" represents a point in a radar point cloud associated with the simulated object, and each "O" represents a point in the background radar data. In some instances, the overlay region 804 may correspond to a bounding box region defined for the simulated object, and/or to a region including a bounding box having a surrounding buffer. It can be seen in this example that some of the "X"

radar points associated with the simulated object are outside of the overlay region 804 for the simulated object.

To perform the probabilistic merging technique illustrated in diagram 800A, the simulation system 102 may determine and apply probabilities to the "X" and "O" radar points, where the probabilities determine subsets of the radar points that are retained and discarded. For instance, the simulation system 102 may define a first probability for retaining the "O" background radar points within the overlay region 804. The first probability may be lower than a second probability for retaining the "O" background radar points outside of the overlay region 804. The first and second probabilities may be individually applied to each "O" background radar point, causing the simulation system 102 to retain a smaller percentage of the background radar points inside the overlay region 804 and a larger percentage outside the overlay region 804. Additionally, the simulation system 102 may define a third probability for retaining the "X" simulated object radar points within the overlay region 804, which may be higher than a fourth probability for retaining the "X" simulated object radar points outside the overlay region 804. The third and fourth probabilities may be individually applied to each "X" object radar point, causing the simulation system 102 to retain a larger percentage of the object radar point cloud inside the overlay region 804 and a smaller percentage outside the overlay region 804.

In FIG. 8B, diagram 800B illustrates another radar background region 806 containing a first overlay region 808 associated with a simulated object to be rendered in a synthetic simulation, and a second overlay region 810 surrounding the first overlay region 808. In this example, the second overlay region 810 may represent a buffer region within which intermediate probabilities can be applied for retaining/discarding radar points. In some examples, the use of a second overlay region 810 may generate improved (e.g., more realistic) simulated radar data, which can provide more accurate and realistic outputs from the trained perception models, along with improved testing and validation of the simulated vehicle controllers. As in the above example, each "X" in diagram 800B represents a point in a radar point cloud associated with a simulated object, and each "O" represents a point in the background radar data.

To perform the probabilistic merging technique illustrated in diagram 800B, the simulation system 102 may determine and apply probabilities to the "X" and "O" radar points, where the probabilities determine subsets of the radar points that are retained and discarded. For instance, the simulation system 102 may define a first probability for retaining "O" background radar points within the first overlay region 808, a second probability greater than the first probability for retaining "O" background radar points within the buffer region of the second overlay region 810, and a third probability greater than the second probability for retaining "O" background radar points outside of the second overlay region 810. Additionally, the simulation system 102 may define a fourth probability for retaining the "X" simulated object radar points within the first overlay region 808, a fifth probability less than the fourth probability for retaining the "X" simulated object radar points within the buffer region of the second overlay region 810, and a sixth probability less than the fifth probability for retaining the "X" simulated object radar points outside of the second overlay region 810.

In some examples, the simulation system 102 may perform additional testing and/or validation on the simulation radar data generated using the simulation radar data store 222. For instance, the simulation radar data 716 depicted in FIG. 7 and the examples shown in FIG. 8A and FIG. 8B may be referred to as combined simulation radar data, in that each example includes a combination of multiple sets of radar data points. Such combinations may include different background radar and/or object radar data retrieved from the simulation radar data store 222, and/or programmatically generated background or object radar data, that have been combined by overlaying or integrating into a single set of simulation radar data. As described above, these combined simulation radar data may be used to generate sensor data views and/or provided as input to simulated radar sensors during simulations.

Before using a combined simulation radar data in a simulation, the simulation system 102 may perform additional validations based on the total number of radar data points and/or the numbers of radar data points associated with each simulated object. For example, the simulation system 102 may compare the total number of radar points in a combined simulation radar data (e.g., simulation radar data 716) to a maximum allowable number of radar points. The maximum allowable number may be, for example, a maximum number of points output at any one timestep by a radar hardware/system associated with a simulated vehicle that may receive the simulation radar data. When a combined simulation radar data exceeds the maximum allowable number of radar points, the simulation system 102 may use a probabilistic technique to reduce the overall number of radar points. For example, the simulation system 102 may determine a removal probability based on the difference between the current number of radar points and allowable number of radar points, and may apply the removal probability to each radar point in the combined simulation radar data. In some cases, the simulation system 102 may monitor and/or modify the probabilistic removal of radar points to assure that a minimum number of radar points (e.g., 5 points) are retained for each simulated object.

Figure 9:
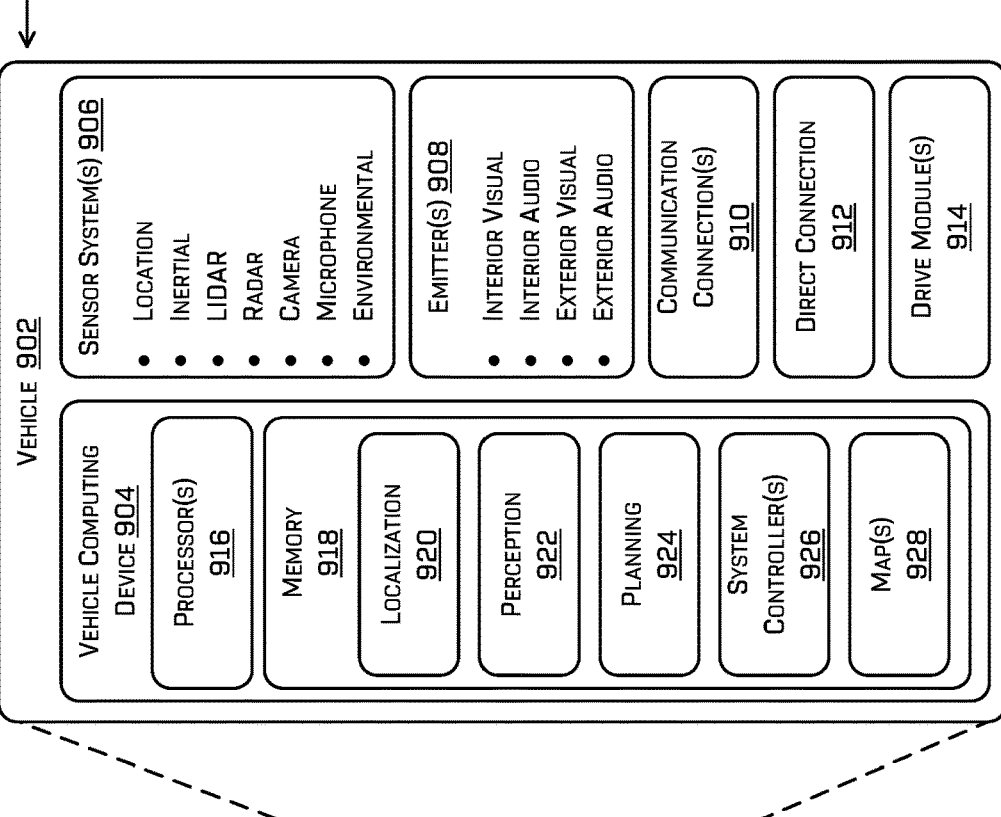
FIG. 9 depicts a block diagram of an example system for implementing various techniques described herein.

FIG. 9 depicts a block diagram of an example system 900 for implementing the techniques described herein. In at least one example, the system 900 can include a vehicle 902, which can be an actual vehicle capable of navigating an environment, or a simulated vehicle instantiated during a driving simulation, as described above with reference to FIGS. 1-8. The system 900 also may include one or more computing devices 932, which can be implemented as a simulation system and/or sensor engine, and may be same as or similar to the simulation system 102 described above with reference to FIG. 1.

The vehicle 902 may correspond to a physical autonomous vehicle traversing through a physical environments, and/or to a simulated vehicle operating within a virtual and/or log-based simulation. Both for implementations including real vehicles and simulated vehicles, the vehicle 902 may include various software-based and/or hardware-based components of an autonomous vehicle, and may be used to control autonomous vehicles traversing through physical or simulated environments.

The vehicle 902 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, a vehicle control system may operate within a real associated vehicle, such as a fully or partially autonomous vehicle having any other level or classification. In some instances, the techniques described herein may be usable by non-autonomous vehicles as well. Additionally or alternatively, the vehicle 902 may operate independently from a physical vehicle, for example, as a hardware and software-based controller for a simulated vehicle executing in a computing environment during the development, testing, and validation processes for the vehicle 902. In addition, while implementations of the vehicle 902 described herein may include simulating a control system of an autonomous vehicle, semi-autonomous vehicle, or a non-autonomous vehicle, some of the techniques may be in a simulated environment, using a simulated vehicle.

The vehicle 902 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle 902 can be powered by one or more internal combustion engines, one or more electric motors, hydrogen power, any combination thereof, and/or any other suitable power sources. Although the associated vehicle may have four wheels, the vehicle 902 and associated techniques described herein can be incorporated into vehicles having fewer or a greater number of wheels, and/or tires. The vehicle 902 can include systems to control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

In some examples, vehicle 902 can include a vehicle computing device 904, one or more sensor systems 906, one or more emitters 908, one or more communication connections 910, at least one direct connection 912, and one or more drive assemblies 914. The vehicle computing device 904 can include one or more processors 916 and memory 918 communicatively coupled with the one or more processors 916. In the illustrated example, the vehicle 902 is an autonomous vehicle; however, the vehicle 902 could be any other type of vehicle, or any other system having one or more sensor systems. In the illustrated example, the memory 918 of the vehicle computing device 904 stores a localization component 920, a perception component 922, a planning component 924, one or more system controllers 926, and one or more maps 928. Though depicted in FIG. 9 as residing in memory 918 for illustrative purposes, it is contemplated that the localization component 920, the perception component 922, the planning component 924, the one or more system controllers 926, and the one or more maps 928 may additionally, or alternatively, be accessible to the vehicle 902 (e.g., stored remotely).

In at least one example, the localization component 920 can include functionality to receive data from the sensor system(s) 906 to determine a position of the vehicle 902. For example, the localization component 920 can include and/or request/receive a map of an environment and can continuously determine a location of the autonomous vehicle within the map. In some instances, the localization component 920 can utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 920 can provide data to various components of the vehicle 902 to determine an initial position of an autonomous vehicle for generating a candidate trajectory, as discussed herein.

In some instances, the perception component 922 can include functionality to perform object detection, segmentation, and/or classification. In some examples, the perception component 922 can provide processed sensor data that indicates a presence of an entity that is proximate to the vehicle 902 and/or a classification of the entity as an entity type (e.g., car, pedestrian, cyclist, animal, building, tree, road surface, curb, sidewalk, unknown, etc.). In additional and/or alternative examples, the perception component 922 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In general, the planning component 924 can determine a path for the vehicle 902 to follow to traverse through an environment. For example, the planning component 924 can determine various routes and trajectories and various levels of detail. For example, the planning component 924 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 924 can generate an instruction for guiding the autonomous vehicle along at least a portion of the route from the first location to the second location. In at least one example, the planning component 924 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique.

In at least one example, the vehicle computing device 904 can include one or more system controllers 926, which can be configured to control steering, propulsion, braking, safety, emitters, communication, and other systems of the vehicle 902. These system controller(s) 926 can communicate with and/or control corresponding systems of the drive assembly(s) 914 and/or other components of the vehicle 902.

The memory 918 can further include one or more maps 928 that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In one example, a map can include a three-dimensional mesh generated using the techniques discussed herein. In some instances, the map can be stored in a tiled format, such that individual tiles of the map represent a discrete portion of an environment, and can be loaded into working memory as needed. In at least one example, the one or more maps 928 may include at least one map (e.g., images and/or a mesh) generated in accordance with the techniques discussed herein. In some example, the vehicle 902 can be controlled based at least in part on the maps 928. That is, the maps 928 can be used in connection with the localization component 920, the perception component 922, and/or the planning component 924 to determine a location of the vehicle 902, identify objects in an environment, and/or generate routes and/or trajectories to navigate within an environment.

In some examples, the one or more maps 928 may be stored on a remote computing device(s) (such as the computing device(s) 932) accessible via network(s) 930. In some examples, multiple maps 928 may be stored based on, for example, a characteristic (e.g., type of entity, time of day, day of week, season of the year, etc.). Storing multiple maps 928 may have similar memory requirements, but increase the speed at which data in a heat map may be accessed.

In some instances, aspects of some or all of the components discussed herein may include any models, algorithms, and/or machine learning algorithms. For example, in some instances, the components in the memory 918 (and the memory 936, discussed below) may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 906 can include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 906 can include multiple instances of each of these or other types of sensors. For instance, the LIDAR sensors can include individual LIDAR sensors located at the corners, front, back, sides, and/or top of the vehicle 902. As another example, the camera sensors can include multiple cameras disposed at various locations about the exterior and/or interior of the vehicle 902. The sensor system(s) 906 can provide input to the vehicle computing device 904. Additionally or alternatively, the sensor system(s) 906 can send sensor data, via the one or more networks 930, to the one or more computing device(s) at a particular frequency, after a lapse of a predetermined period of time, in near real-time, etc.

The vehicle 902 can also include one or more emitters 908 for emitting light and/or sound, as described above. The emitters 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 can also include one or more communication connection(s) 910 that enable communication between the vehicle 902 and one or more other local or remote computing device(s). For instance, the communication connection(s) 910 can facilitate communication with other local computing device(s) on the vehicle 902 and/or the drive assembly(s) 914. Also, the communication connection(s) 910 can allow the vehicle to communicate with other nearby computing device(s) (e.g., other nearby vehicles, traffic signals, etc.). The communications connection(s) 910 also enable the vehicle 902 to communicate with a remote teleoperations computing device or other remote services.

The communications connection(s) 910 can include physical and/or logical interfaces for connecting the vehicle computing device 904 to another computing device or a network, such as network(s) 930. For example, the communinications connection(s) 910 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 902 can include one or more drive assemblies 914. In some examples, the vehicle 902 can have a single drive assembly 914. In at least one example, if the vehicle 902 has multiple drive assemblies 914, individual drive assemblies 914 can be positioned on opposite ends of the vehicle 902 (e.g., the front and the rear, etc.). In at least one example, the drive assembly(s) 914 can include one or more sensor systems to detect conditions of the drive assembly(s) 914 and/or the surroundings of the vehicle 902. By way of example and not limitation, the sensor system(s) can include one or more wheel encoders (e.g., rotary encoders) to sense rotation of the wheels of the drive assemblies, inertial sensors (e.g., inertial measurement units, accelerometers, gyroscopes, magnetometers, etc.) to measure orientation and acceleration of the drive assembly, cameras or other image sensors, ultrasonic sensors to acoustically detect objects in the surroundings of the drive assembly, LIDAR sensors, radar sensors, etc. Some sensors, such as the wheel encoders can be unique to the drive assembly(s) 914. In some cases, the sensor system(s) on the drive assembly(s) 914 can overlap or supplement corresponding systems of the vehicle 902 (e.g., sensor system(s) 906).

The drive assembly(s) 914 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 914 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more programs or instructions to perform various functionalities of the drive assembly(s) 914. Furthermore, the drive assembly(s) 914 also include one or more communication connection(s) that enable communication by the respective drive assembly with one or more other local or remote computing device(s).

In at least one example, the localization component 920, perception component 922, and/or the planning component 924 can process sensor data, as described above, and can send their respective outputs, over the one or more network(s) 930, to one or more computing device(s) 932. In at least one example, the localization component 920, the perception component 922, and/or the planning component 924 can send their respective outputs to the one or more computing device(s) 932 at a particular frequency, after a lapse of a predetermined period of time, in near real-time, etc.

As described above with reference to FIGS. 1-8, and as discussed throughout this disclosure, the vehicle 902 can send sensor data to one or more computing device(s) 932, via the network(s) 930. In some examples, the vehicle 902 can send raw sensor data to the computing device(s) 932. In other examples, the vehicle 902 can send processed sensor data and/or representations of sensor data to the computing device(s) 932. In some examples, the vehicle 902 can send sensor data to the computing device(s) 932 at a particular frequency, after a lapse of a predetermined period of time, in near real-time, etc. In some cases, the vehicle 902 can send sensor data (raw or processed) to the computing device(s) 932 as one or more log files.

During a driving simulation, the computing device(s) 932 can execute the simulation including the simulated environment and/or simulated agents/objects. The computing device(s) 932 may provide the simulation data to the vehicle 902 in the form of sensor data to be detected and processed by the sensor system(s) 906 of the vehicle. During a simulation, the vehicle 902 may respond to the sensor input provided by the computing device(s) 932, while the simulation environment and agents/object executing on the computing device(s) 932 may detect and respond to the vehicle control commands output by the vehicle 902 (e.g., via the system controller 926) that control the movement and other actions performed by the vehicle 902.

In at least one example, the computing device(s) 932 can include one or more processors 934 and memory 936 communicatively coupled with the one or more processors 934. In the illustrated example, the memory 936 of the computing device(s) 932 stores a log data analysis component 938 and a simulation generation component(s) 940. The log data analysis component 938 may be configured to generate simulation radar data based on log data captured by vehicle 902, as described above in reference to FIGS. 1-6. The simulation generation component(s) 940 may be configured to generate simulation radar data for use in synthetic simulations, based on stored object radar data and/or background radar data, as described above in reference to FIGS. 1 and 6-8B.

The processor(s) 916 of the vehicle 902 and the processor(s) 934 of the computing device(s) 932 can be any suitable processor capable of executing instructions to process data and perform operations as described herein. By way of example and not limitation, the processor(s) 916 and 934 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 918 and memory 936 are examples of non-transitory computer-readable media. Memory 918 and memory 936 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. It should be noted that while FIG. 9 is illustrated as a distributed system, in alternative examples, components of the vehicle 902 can be associated with the computing device(s) 932 and/or components of the computing device(s) 932 can be associated with the vehicle 902. That is, the vehicle 902 can perform one or more of the functions associated with the computing device(s) 932, and vice versa.

FIG. 10 depicts an example process 1000 for generating simulation radar data for use in synthetic simulations based on sensor data captured in a real-world environment. As described below, some or all of the operations described in process 1000 can be performed by components discussed above in FIGS. 1-9, such as simulation system 102 including a log data analysis component 938.

At operation 1002, the simulation system 102 may receive log data including sensor data captured of a real-world environment. The log data received at operation 1002 may include sensor data captured by one or more vehicles operating in real-world driving environments. As discussed above, the log data may include any data relating to real-world objects detected within an environment (e.g., a non-virtual, non-computer generated environment), including object types, sizes, positions, poses, velocities, etc., as well as data relating to the environment itself (e.g., weather conditions, road conditions, sun position, time, day, etc.). Operation 1002 may include receiving log data captured by a single vehicle or any number of vehicles (and/or or other sensor systems) within various environments, each of which may represent a different configuration of objects, different environment attributes, etc.

At operation 1004, the simulation system 102 may determine one or more objects in the environment, based on the sensor data. The simulation system 102 also may determine one or more object attributes associated with the objects determined in operation 1004. In some examples, the simulation system 102 may use sampling (e.g., random sampling) from a corpus of log data to determine particular log data sources, files, frames, and objects. After determining one or more objects, the simulation system 102 may use the various techniques described herein to determine object attributes based on the multi-modal sensor data. The object attributes for the objects detected in the log data may include, but are not limited to, object types or classifications, object positions, object sizes, object poses, object velocities, object accelerations, object material compositions, etc.

At operation 1006, the simulation system 102 may determine radar point clouds associated with the objects determined in operation 1004. In some examples, the simulation system 102 may determine bounding boxes (or bounding contours) for the detected objects, and then may collect the sets of radar data points within the bounding box for each object, and/or within buffer regions surrounding the bounding boxes for each object. Additionally or alternatively, the simulation system 102 may perform a density-based clustering algorithm to determine the radar points associated with each of the objects.

At operation 1008, the simulation system 102 may determine whether or not the object radar data determined in operations 1004 and 1006 is to be stored in a simulation radar data store 222. For example, when the simulation system 102 determines that the object radar data captured for an object is noisy, low-resolution, and/or may be affected by other nearby objects in the environment, the simulation system 102 may determine to discard the object radar data (1008:No), and in operation 1010 may use sampling to determine a next object within the log data to be analyzed and/or included within the object radar data in the simulation radar data store 222. In other examples, when the simulation system 102 determines that a sufficient number of object radar data is stored in the simulation radar data store 222 with similar or identical objects attributes, the simulation system 102 also may determine to discard the object radar data (1008:No) and proceed with operation 1010 to determine a next object.

When the simulation system 102 determines to retain the object radar data for the detected object(s) (1008:Yes), then at operation 1012 the simulation system 102 may modify the object radar point cloud data collected in operation 1006 and/or the object attributes determined in operation 1004. As described above, such modifications may include removing certain data fields and/or discretizing radar data elements or object attributes into a discreet number of values ranges. These modifications may provide advantages of reducing the size and dimensionality of the simulation radar data store 222.

At operation 1014, the simulation system 102 may store the modified object radar point cloud data in the simulation radar data store 222, along with the associated object attributes. By storing real-world object radar data, extracted from log data, along with associated object attributes the simulation system 102, the simulation radar data store 222 may be queries to retrieve object radar data for simulated objects in synthetic simulations. Additionally, although this example relates to detecting and storing real-world radar data associated with objects, similar or identical techniques can be used for detecting and storing real-world background radar with associated environment attributes, in the simulation radar data store 222.

FIG. 11 depicts an example process 1100 of retrieving object radar data and background radar data based on simulation data for a synthetic simulation, and generating simulation radar data for use in the synthetic simulation. As described below, some or all of the operations described in process 1000 can be performed by components discussed above in FIGS. 1-9, such as simulation system 102 including a simulation generation component(s) 940, which may be similar or identical to the simulation generation component(s) 702, described above.

At operation 1102, the simulation system 102 may receive simulation data for a requested synthetic simulation to be generated. Based on the simulation data, the simulation system 102 may determine simulated object data for one or more objects to be rendered in the synthetic simulation. As described above, a driving scenario for a synthetic simulation may define a number of a simulated objects to be rendered in the synthetic simulation, including parameters defining object attributes and/or behaviors for each object. For example, the simulation data may include data identifying a number of simulated objects to be rendered during a synthetic simulation, as well as object classifications, positions, sizes, poses, velocities, material compositions, and the like for each simulated object.

At operation 1104, the simulation system 102 may retrieve object radar data from the simulation radar data store 222 to represent the simulated objects in the synthetic simulation. For example, the simulation system 102 may query the simulation radar data store 222 to determine an object (or multiple objects) with attributes matching the attributes of the requested simulated objects for the synthetic simulation. The simulation system 102 may retrieve radar point clouds (and/or other object radar data) from the simulation radar data store 222 for the matching objects.

At operation 1106, the simulation system 102 may retrieve background radar data from the simulation radar data store 222 based on one or more attributes of simulated environment (and/or driving scenario) of the synthetic simulation. For example, the simulation system 102 may query the simulation radar data store 222 to determine background radar data with attributes matching the attributes of the synthetic simulation data (e.g., driving scenario data, driving conditions data, etc.). The simulation system 102 may retrieve radar point clouds (and/or other background radar data) from the simulation radar data store 222 for the matching background environment.

At operation 1108, the simulation system 102 may determine whether to perform a probabilistic merge technique to combine the object radar data retrieved in operation 1104 with the background radar data retrieved in operation 1106. As described above, the simulation system 102 may use various different techniques, individually or in combination, to generate the simulation radar data for the synthetic simulation based on real-world object radar data and background radar data.

When the simulation system 102 is configured to use probabilistic merging (1108:Yes), then at operation 1110 the simulation system 102 may determine subsets of the object radar data and the background radar data to combine, based on probabilities associated one or more overlay regions. For example, the simulation system 102 may define one or more overlay regions, and apply probabilities based on the overlay regions and the type of radar data (e.g., object versus background data) to determine subsets of the object radar data and the background radar data to use to generate the simulation radar data for the synthetic simulation At operation 1112, the simulation system 102 may generate simulation radar data for use during the synthetic simulation, based on the combined object radar data and the background radar data. In some cases, the simulation system 102 may overlay the object radar data (or subset thereof) onto the background radar data (or subset thereof), either by aggregating the radar points of the object radar data and the background radar data, or by replacing regions of the background radar data with the corresponding regions of the object radar data.

Finally, at operation 1114, the simulation system 102 may provide the simulation radar data generated in operation 1112, to a simulated radar sensor during execution of the synthetic simulation. As described above, by providing simulated radar sensors in synthetic simulations with real-world radar data, the trained perception models executed during the simulation may provide more accurate and realistic outputs. As a result, the techniques described herein improve testing and validation of the features and functionalities of the simulated vehicle controllers, which further improves the vehicle safety and efficiency of autonomous and semi-autonomous vehicles operating in driving environments.

EXAMPLE CLAUSES

A. A system comprising: a radar point cloud data store; one or more processors; and one or more computer-readable media storing computer-executable instructions that, when executed, cause the one or more processors to perform operations comprising: receiving log data based at least in part on sensor data captured by a vehicle operating in an environment, wherein the log data includes radar data associated with the environment; determining, based at least in part on the log data, a plurality of attributes associated with an object represented in the log data; determining, based at least in part on the radar data, a radar point cloud associated with the object; storing, in the radar point cloud data store, an object entry associated with the object represented in the log data, the object entry comprising the plurality of attributes and the radar point cloud; receiving simulated object data associated with a simulated object in a simulation; determining, based at least in part on the simulated object data, a second plurality of attributes associated with the simulated object; determining, based at least in part on comparing the plurality of attributes associated with the object and the second plurality of attributes associated with the simulated object, to use the object entry for the simulation; and rendering the simulated object during the simulation, wherein rendering the simulated object includes providing the radar point cloud as input to a simulated radar sensor.

B. The system of paragraph A, wherein the radar point cloud data store stores a plurality of object entries, wherein an object entry of the plurality of object entries includes: a range of an object associated with the object entry; an azimuth of an object associated with the object entry; a yaw of an object associated with the object entry; a doppler value of an object associated with the object entry; a width of an object associated with the object entry; and a height of an object associated with the object entry.

C. The system of paragraph A, wherein storing the object entry comprises: determining a first plurality of radar points in the radar point cloud; and modifying individual radar points of the first plurality of radar points to generate a second plurality of radar points, wherein the modifying includes modifying at least one of a radar cross-section value or a velocity value of the individual radar points.

D. The system of paragraph A, wherein determining the radar point cloud associated with the object comprises: determining a bounding box associated with the object, based at least in part on the sensor data; determining a buffer region around the bounding box; and determining, as the radar point cloud, a set of radar data points within the bounding box and the buffer region.

E. The system of paragraph A, the operations further comprising: inputting, during the simulation, the radar point cloud to a trained neural network configured to detect objects based on sensor data.

F. A method comprising: receiving log data based at least in part on sensor data captured by a vehicle operating in an environment, wherein the log data includes radar data associated with the environment; determining, based at least in part on the log data, an object represented in the log data and an attribute associated with the object; determining, based at least in part on the radar data, a plurality of radar points associated with the object, wherein the plurality of radar points excludes other radar data from a scene of the environment from which the plurality of radar points was captured; and storing object simulation data in a data store, the object simulation data including the attribute and the plurality of radar points.

G. The method of paragraph F, wherein determining the plurality of radar points comprises: determining a first radar point in the plurality of radar points; modifying the first radar point to generate a modified radar point, wherein the modifying includes modifying at least one of a radar cross-section value or a velocity value of the first radar point; and replacing the first radar point in the plurality of radar points with the modified radar point.

H. The method of paragraph F, wherein determining the plurality of radar points associated with the object comprises at least one of: executing a density-based clustering algorithm on the radar data; or determining a set of radar data points within a bounding box associated with the object.

I. The method of paragraph F, wherein determining the plurality of radar points associated with the object comprises: determining a bounding box associated with the object, based at least in part on the sensor data; determining a buffer region around the bounding box; and determining, as the plurality of radar points, a set of radar data points within the bounding box and the buffer region.

J. The method of paragraph F, wherein the attribute associated with the object comprises at least one of: a range of the object; an azimuth of the object; a yaw of the object; an object classification of the object; a width of a bounding box associated with the object; or a height of a bounding box associated with the object.

K. The method of paragraph F, further comprising: receiving simulation data representing a simulated environment; determining, based at least in part on the simulation data, a simulated object within the simulated environment and a second attribute associated with the simulated object; determining the object simulation data from the data store, based at least in part on the attribute and the second attribute; and retrieving, from the data store, the plurality of radar points.

L. The method of paragraph K, wherein the attribute and the second attribute include at least one of a relative object position or a relative object angle, and wherein determining the object simulation data comprises determining that a difference between the attribute and the second attribute is less than a threshold.

M. The method of paragraph K, further comprising: determining, based at least in part on the log data, at least one of: a first object classification associated with the object; a first angular velocity associated with the object; or a first occlusion associated with the object, wherein the simulated object includes at least one of: a second object classification different from the first object classification; a second angular velocity different from the first angular velocity; or a second occlusion different from the first occlusion.

N. One or more non transitory computer readable media storing instructions executable by a processor, wherein the instructions, when executed, cause the processor to perform operations comprising: receiving simulation data representing a simulated environment associated with a simulation; determining, based at least in part on the simulation data, a simulated object within the simulated environment and a first attribute associated with the simulated object; determining, from a data store and based at least in part on the first attribute, object simulation data associated with a non-simulated object represented in sensor data captured by a vehicle operating in an environment, wherein the object simulation data includes a second attribute associated with the non-simulated object and a plurality of radar points associated with the non-simulated object, and wherein the plurality of radar points excludes other radar data from a scene of the environment from which the plurality of radar points was captured; retrieving, the plurality of radar points from the data store; generating simulation radar data based at least in part on the plurality of radar points; and rendering the simulated object during the simulation, wherein rendering the simulated object includes providing the simulation radar data as input to a simulated radar sensor.

O. The one or more non transitory computer readable media of paragraph N, wherein generating the simulation radar data comprises: determining a first radar point in the plurality of radar points; and modifying the first radar point to generate a second radar point, wherein the modifying includes modifying at least one of a radar cross-section value or a velocity value of the first radar point.

P. The one or more non transitory computer readable media of paragraph N, wherein the plurality of radar points includes: a first radar point of the sensor data, within a bounding box associated with the non-simulated object; and a second radar point of the sensor data, within a buffer region around the bounding box.

Q. The one or more non transitory computer readable media of paragraph N, wherein generating the simulation radar data comprises: determining a difference between the first attribute and the second attribute; and applying a linear transformation to the plurality of radar points, based at least in part on the difference.

R. The one or more non transitory computer readable media of paragraph N, wherein the first attribute associated with the simulated object comprises at least one of: a range of the simulated object; an azimuth of the simulated object; a yaw of the simulated object; an object classification of the simulated object; a width of a bounding box associated with the simulated object; or a height of a bounding box associated with the simulated object.

S. The one or more non transitory computer readable media of paragraph N, wherein the first attribute and the second attribute include at least one of a relative object position or a relative object angle, and wherein determining the object simulation data comprises determining that a difference between the first attribute and the second attribute is less than a threshold.

T. The one or more non transitory computer readable media of paragraph N, the operations further comprising: determining, based at least in part on the simulation data, at least one of: a first object classification associated with the simulated object; a first angular velocity associated with the simulated object; or a first occlusion associated with the simulated object, and wherein the non-simulated object includes at least one of: a second object classification different from the first object classification; a second angular velocity different from the first angular velocity; or a second occlusion different from the first occlusion.

U. A system comprising: one or more processors; and one or more computer-readable media storing computer-executable instructions that, when executed, cause the one or more processors to perform operations comprising: receiving simulation data associated with an autonomous vehicle simulation, the simulation data including a simulated environment and a simulated object; determining, based at least in part on the simulation data, an attribute associated with the simulated object; retrieving, from a radar data store, radar object data corresponding to the simulated object, based at least in part on comparing the attribute to a second attribute associated with the radar object data, wherein the radar object data includes a first plurality of radar data points; determining radar background data, based at least in part on the simulated environment, wherein the radar background data includes a second plurality of radar data points; determining an overlay region within the radar background data, based at least in part on a position of the simulated object relative to a simulated radar sensor within the autonomous vehicle simulation; generating simulation radar data based at least in part on the radar object data and the radar background data, wherein the simulation radar data includes a first radar data point of the first plurality of radar data points within the overlay region and a second radar data point of the second plurality of radar data points within the overlay region; and rendering the simulated object during the autonomous vehicle simulation, wherein rendering the simulated object includes providing the simulation radar data as input to the simulated radar sensor.

V. The system of paragraph U, wherein generating the simulation radar data further comprises: determining, based at least in part on a first probability, a first subset of the first plurality of radar data points to retain within the overlay region; and determining, based at least in part on a second probability, a second subset of the second plurality of radar data points to retain within the overlay region, wherein the first probability is greater than the second probability.

W. The system of paragraph U, wherein generating the simulation radar data comprises: determining a second overlay region surrounding the overlay region within the radar background data; determining, based at least in part on a first probability, a first subset of the radar background data to retain within the overlay region; determining, based at least in part on a second probability, a second subset of the radar background data to retain within the second overlay region, wherein the first probability is less than the second probability; and determining, based at least in part on a third probability, a third subset of the radar background data to retain outside of the second overlay region, wherein the second probability is less than the third probability.

X. The system of paragraph W, wherein generating the simulation radar data further comprises: determining, based at least in part on a fourth probability, a fourth subset of the radar object data to retain within the overlay region; and determining, based at least in part on a fifth probability, a fifth subset of the radar object data to retain within the second overlay region, wherein the fourth probability is greater than the fifth probability.

Y. The system of paragraph U, further comprising generating the radar background data, wherein generating the radar background data comprises: receiving log data based at least in part on sensor data captured by a vehicle operating in an environment, wherein the log data includes radar data representing the environment; determining an object represented in the log data; determining a first subset of the radar data associated with the object; and determining the radar background data, by removing the first subset of the radar data associated with the object from the radar data representing the environment.

Z. A method comprising: receiving data associated with a simulated object in a simulation; determining, based at least in part on the data associated with the simulated object, radar object data including a first plurality of radar data points; determining radar background data including a second plurality of radar data points; generating simulation radar data based at least in part on the first plurality of radar data points and the second plurality of radar data points; and rendering the simulated object during the simulation, wherein rendering the simulated object includes providing the simulation radar data as input to a simulated radar sensor.

AA. The method of paragraph Z, wherein generating the simulation radar data comprises: determining an overlay region within the radar background data, based at least in part on a position of the simulated object relative to the simulated radar sensor within the simulation; and overlaying the radar object data onto the radar background data, within the overlay region, wherein the simulation radar data includes a first radar data point of the first plurality of radar data points within the overlay region and a second radar data point of the second plurality of radar data points within the overlay region.

AB. The method of paragraph AA, wherein generating the simulation radar data further comprises: determining, based at least in part on a first probability, a first subset of the first plurality of radar data points to retain within the overlay region; and determining, based at least in part on a second probability, a second subset of the second plurality of radar data points to retain within the overlay region, wherein the first probability is greater than the second probability.

AC. The method of paragraph AA, wherein generating the simulation radar data further comprises: determining, based at least in part on a first probability, a first subset of the second plurality of radar data points to retain within the overlay region; and determining, based at least in part on a second probability, a second subset of the second plurality of radar data points to retain outside of the overlay region, wherein the first probability is less than the second probability.

AD. The method of paragraph Z, wherein generating the simulation radar data further comprises: determining a first overlay region within the radar background data, based at least in part on a position of the simulated object relative to the simulated radar sensor within the simulation; determining a second overlay region surrounding the first overlay region within the radar background data; determining, based at least in part on a first probability, a first subset of the second plurality of radar data points to retain within the first overlay region; determining, based at least in part on a second probability, a second subset of the second plurality of radar data points to retain within the second overlay region, wherein the first probability is less than the second probability; and determining, based at least in part on a third probability, a third subset of the second plurality of radar data points to retain outside of the second overlay region, wherein the second probability is less than the third probability.

AE. The method of paragraph AD, wherein generating the simulation radar data further comprises: determining, based at least in part on a fourth probability, a fourth subset of the first plurality of radar data points to retain within the first overlay region; and determining, based at least in part on a fifth probability, a fifth subset of the first plurality of radar data points to retain within the second overlay region, wherein the fourth probability is greater than the fifth probability.

AF. The method of paragraph Z, wherein determining the radar background data comprises: receiving log data based at least in part on sensor data captured by a vehicle operating in an environment, wherein the log data includes radar data representing the environment; determining, based at least in part on the sensor data, that an agent is not represented within the radar data; determining, based at least in part on the sensor data, an attribute associated with the environment; and storing a radar background entry in a radar background data store, the radar background entry comprising the attribute and the radar data.

AG. The method of paragraph Z, wherein determining the radar background data comprises: receiving log data based at least in part on sensor data captured by a vehicle operating in an environment, wherein the log data includes radar data representing the environment; determining an object represented in the log data; determining a first subset of the radar data associated with the object; and determining the second plurality of radar data points, by removing the first subset of the radar data associated with the object from the radar data representing the environment.

AH. One or more non transitory computer readable media storing instructions executable by a processor, wherein the instructions, when executed, cause the processor to perform operations comprising: receiving data associated with a simulated object in a simulation; determining, based at least in part on the data associated with the simulated object, radar object data including a first plurality of radar data points; determining radar background data including a second plurality of radar data points; generating simulation radar data based at least in part on the first plurality of radar data points and the second plurality of radar data points; and rendering the simulated object during the simulation, wherein rendering the simulated object includes providing the simulation radar data as input to a simulated radar sensor.

AI. The one or more non transitory computer readable media of paragraph AH, wherein generating the simulation radar data comprises: determining an overlay region within the radar background data, based at least in part on a position of the simulated object relative to the simulated radar sensor within the simulation; and overlaying the radar object data onto the radar background data, within the overlay region, wherein the simulation radar data includes a first radar data point of the first plurality of radar data points within the overlay region and a second radar data point of the second plurality of radar data points within the overlay region.

AJ. The one or more non transitory computer readable media of paragraph AI, wherein generating the simulation radar data further comprises: determining, based at least in part on a first probability, a first subset of the first plurality of radar data points to retain within the overlay region; and determining, based at least in part on a second probability, a second subset of the second plurality of radar data points to retain within the overlay region, wherein the first probability is greater than the second probability.

AK. The one or more non transitory computer readable media of paragraph AI, wherein generating the simulation radar data further comprises: determining, based at least in part on a first probability, a first subset of the second plurality of radar data points to retain within the overlay region; and determining, based at least in part on a second probability, a second subset of the second plurality of radar data points to retain outside of the overlay region, wherein the first probability is less than the second probability.

AL. The one or more non transitory computer readable media of paragraph AH, wherein generating the simulation radar data further comprises: determining a first overlay region within the radar background data, based at least in part on a position of the simulated object relative to the simulated radar sensor within the simulation; determining a second overlay region surrounding the first overlay region within the radar background data; determining, based at least in part on a first probability, a first subset of the second plurality of radar data points to retain within the first overlay region; determining, based at least in part on a second probability, a second subset of the second plurality of radar data points to retain within the second overlay region, wherein the first probability is less than the second probability; and determining, based at least in part on a third probability, a third subset of the second plurality of radar data points to retain outside of the second overlay region, wherein the second probability is less than the third probability.

AM. The one or more non transitory computer readable media of paragraph AL, wherein generating the simulation radar data further comprises: determining, based at least in part on a fourth probability, a fourth subset of the first plurality of radar data points to retain within the first overlay region; and determining, based at least in part on a fifth probability, a fifth subset of the first plurality of radar data points to retain within the second overlay region, wherein the fourth probability is greater than the fifth probability.

AN. The one or more non transitory computer readable media of paragraph AH, wherein determining the radar background data comprises: receiving log data based at least in part on sensor data captured by a vehicle operating in an environment, wherein the log data includes radar data representing the environment; determining, based at least in part on the log data, an object represented in the log data; determining a first subset of the radar data associated with the object; and determining the second plurality of radar data points, by removing the first subset of the radar data associated with the object from the radar data representing the environment.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing blocks, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. One or more non-transitory computer-readable media storing instructions executable by a processor, wherein the instructions, when executed, cause the processor to perform operations comprising:

receiving simulation data representing a simulated environment associated with a simulation;

determining, based at least in part on the simulation data, a simulated object within the simulated environment and a first attribute associated with the simulated object;

determining, using a data store and based at least in part on the first attribute, that a non-simulated object represented in sensor data corresponds to the simulated object, wherein the sensor data comprises data from a vehicle operating in a real environment;

determining, from the data store and based at least in part on the first attribute, object simulation data associated with the non-simulated object , wherein the object simulation data includes:

a second attribute associated with the non-simulated object, wherein the second attribute corresponds at least in part to the first attribute; and a plurality of radar points associated with the non-simulated object, wherein the plurality of radar points excludes other radar data from a scene of the real environment from which the plurality of radar points was captured;

retrieving the plurality of radar points from the data store;

generating simulation radar data based at least in part on the plurality of radar points; and rendering the simulated object during the simulation, wherein rendering the simulated object includes providing the simulation radar data as input to a simulated radar sensor.

2. The one or more non-transitory computer-readable media of claim 1, wherein generating the simulation radar data comprises:

determining a first radar point in the plurality of radar points; and modifying the first radar point to generate a second radar point, wherein the modifying includes modifying at least one of a radar cross-section value or a velocity value of the first radar point.

3. The one or more non-transitory computer-readable media of claim 1, wherein the plurality of radar points includes:

a first radar point of the sensor data, within a bounding box associated with the non-simulated object; and a second radar point of the sensor data, within a buffer region around the bounding box.

4. The one or more non-transitory computer-readable media of claim 1, wherein generating the simulation radar data comprises:

determining a difference between the first attribute and the second attribute; and applying a linear transformation to the plurality of radar points, based at least in part on the difference.

5. The one or more non-transitory computer-readable media of claim 1, wherein the first attribute associated with the simulated object comprises at least one of:

a range of the simulated object;

an azimuth of the simulated object;

a yaw of the simulated object;

an object classification of the simulated object;

a width of a bounding box associated with the simulated object; or a height of a bounding box associated with the simulated object.

6. The one or more non-transitory computer-readable media of claim 1, wherein the first attribute and the second attribute include at least one of a relative object position or a relative object angle, and wherein determining the object simulation data comprises determining that a difference between the first attribute and the second attribute is less than a threshold.

7. The one or more non-transitory computer-readable media of claim 1, the operations further comprising:

determining, based at least in part on the simulation data, at least one of:

a first object classification associated with the simulated object;

a first angular velocity associated with the simulated object; or a first occlusion associated with the simulated object, and wherein the non-simulated object includes at least one of:

a second object classification different from the first object classification;

a second angular velocity different from the first angular velocity; or a second occlusion different from the first occlusion.

8. A system comprising:

a radar point cloud data store;

one or more processors; and one or more computer-readable media storing computer-executable instructions that, when executed, cause the one or more processors to perform operations comprising:

receiving simulation data representing a simulated environment associated with a simulation;

determining, based at least in part on the simulation data, a simulated object within the simulated environment and a first attribute associated with the simulated object;

determining, using the radar point cloud data store and based at least in part on the first attribute, that a non-simulated object represented in sensor data corresponds to the simulated object, wherein the sensor data comprises data from a vehicle operating in a real environment;

determining, from the radar point cloud data store and based at least in part on the first attribute, object simulation data associated with the non-simulated object, wherein the object simulation data includes:

a second attribute associated with the non-simulated object, wherein the second attribute corresponds at least in part to the first attribute; and a plurality of radar points associated with the non-simulated object, wherein the plurality of radar points excludes other radar data from a scene of the real environment from which the plurality of radar points was captured;

retrieving the plurality of radar points from the radar point cloud data store;

generating simulation radar data based at least in part on the plurality of radar points; and rendering the simulated object during the simulation, wherein rendering the simulated object includes providing the simulation radar data as input to a simulated radar sensor.

9. The system of claim 8, wherein the radar point cloud data store stores a plurality of object entries, wherein an object entry of the plurality of object entries includes:

a range of an object associated with the object entry;

an azimuth of an object associated with the object entry;

a yaw of an object associated with the object entry;

a doppler value of an object associated with the object entry;

a width of an object associated with the object entry; and a height of an object associated with the object entry.

10. The system of claim 8, wherein storing the object simulation data comprises:

determining a first plurality of radar points in the radar point cloud; and modifying individual radar points of the first plurality of radar points to generate a second plurality of radar points, wherein the modifying includes modifying at least one of a radar cross-section value or a velocity value of the individual radar points.

11. The system of claim 8, wherein determining the radar point cloud associated with the object comprises:

determining a bounding box associated with the object, based at least in part on the sensor data;

determining a buffer region around the bounding box; and determining, as the radar point cloud, a set of radar data points within the bounding box and the buffer region.

12. The system of claim 8, the operations further comprising:

inputting, during the simulation, the radar point cloud to a trained neural network configured to detect objects based on the sensor data.

13. A method comprising:

receiving simulation data representing a simulated environment associated with a simulation;

determining, based at least in part on the simulation data, a simulated object within the simulated environment and a first attribute associated with the simulated object;

determining, using a data store and based at least in part on the first attribute, that a non-simulated object represented in sensor data corresponds to the simulated object, wherein the sensor data comprises data from a vehicle operating in a real environment;

determining, from the data store and based at least in part on the first attribute, object simulation data associated with the non-simulated object, wherein the object simulation data includes:

a second attribute associated with the non-simulated object, wherein the second attribute corresponds at least in part to the first attribute; and a plurality of radar points associated with the non-simulated object, wherein the plurality of radar points excludes other radar data from a scene of the real environment from which the plurality of radar points was captured;

retrieving the plurality of radar points from the data store;

generating simulation radar data based at least in part on the plurality of radar points; and rendering the simulated object during the simulation, wherein rendering the simulated object includes providing the simulation radar data as input to a simulated radar sensor.

14. The method of claim 13, wherein determining the plurality of radar points comprises:

determining a first radar point in the plurality of radar points;

modifying the first radar point to generate a modified radar point, wherein the modifying includes modifying at least one of a radar cross-section value or a velocity value of the first radar point; and replacing the first radar point in the plurality of radar points with the modified radar point.

15. The method of claim 13, wherein determining the plurality of radar points associated with the non-simulated object comprises at least one of:

executing a density-based clustering algorithm on the sensor data; or determining a set of radar data points within a bounding box associated with the non-simulated object.

16. The method of claim 13, wherein determining the plurality of radar points associated with the non-simulated object comprises:

determining a bounding box associated with the non-simulated object, based at least in part on the sensor data;

determining a buffer region around the bounding box; and determining, as the plurality of radar points, a set of radar data points within the bounding box and the buffer region.

17. The method of claim 13, wherein at least one of the first attribute or the second attribute comprises at least one of:

a range of the respective simulated or non-simulated object;

an azimuth of the respective simulated or non-simulated object;

a yaw of the respective simulated or non-simulated object;

an object classification of the respective simulated or non-simulated object;

a width of a bounding box associated with the respective simulated or non-simulated object; or a height of a bounding box associated with the respective simulated or non-simulated object.

18. The method of claim 13, wherein the first attribute and the second attribute include at least one of a relative object position or a relative object angle, and wherein determining the object simulation data comprises determining that a difference between the first attribute and the second attribute is less than a threshold.

19. The method of claim 13, further comprising:

determining, based at least in part on the sensor data, at least one of:

a first object classification associated with the non-simulated object;

a first angular velocity associated with the non-simulated object; or a first occlusion associated with the non-simulated object, wherein the simulated object includes at least one of:

a second object classification different from the first object classification;

a second angular velocity different from the first angular velocity; or a second occlusion different from the first occlusion.

20. The method of claim 13, the operations further comprising:

inputting, during the simulation, the radar point cloud to a trained neural network configured to detect objects based on the sensor data.

\* \* \* \* \*